US012802885B2

(12) United States Patent
Yokota et al.

(10) Patent No.: US 12,802,885 B2
(45) Date of Patent: Nov. 17, 2026

(54) CAPACITOR AND METHOD FOR MANUFACTURING CAPACITOR

(71) Applicant: Panasonic Intellectual Property Management Co., Ltd., Osaka (JP)

(72) Inventors: Shuhei Yokota, Toyama (JP); Masanobu Shima, Toyama (JP); Toru Masamoto, Toyama (JP); Hideki Katayama, Toyama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 194 days.

(21) Appl. No.: 19/004,092

(22) Filed: Dec. 27, 2024

(65) Prior Publication Data

US 2025/0232919 A1 Jul. 17, 2025

(30) Foreign Application Priority Data

Jan. 16, 2024 (JP) ................................. 2024-004634

(51) Int. Cl.
*H01G 4/224* (2006.01)
*H01G 4/236* (2006.01)

(52) U.S. Cl.
CPC ............. *H01G 4/224* (2013.01); *H01G 4/236* (2013.01)

(58) Field of Classification Search
None
See application file for complete search history.

(56) References Cited

U.S. PATENT DOCUMENTS

| | | | | |
|---|---|---|---|---|
| 8,018,712 B2 * | 9/2011 | Yang | H02G 5/005 | 361/328 |
| 11,201,017 B2 * | 12/2021 | Imamura | H01G 4/224 | |
| 11,776,758 B2 * | 10/2023 | Urano | H01G 4/012 | 361/328 |
| 2010/0053927 A1 * | 3/2010 | Inoue | H01G 9/28 | 361/328 |
| 2013/0222967 A1 * | 8/2013 | Imamura | H01G 4/38 | 361/301.3 |
| 2021/0343474 A1 * | 11/2021 | Kawahata | H01G 2/08 | |
| 2025/0232919 A1 * | 7/2025 | Yokota | H01G 4/228 | |
| 2025/0372313 A1 * | 12/2025 | Shima | H01G 4/38 | |

(Continued)

FOREIGN PATENT DOCUMENTS

| | | | |
|---|---|---|---|
| JP | 2015-220789 | 12/2015 | |
| JP | WO2017081853 A1 * | 8/2018 | H01G 4/228 |
| JP | 7312942 B2 * | 7/2023 | H01G 2/06 |

(Continued)

OTHER PUBLICATIONS

JP '942 translation (Year: 2023).*

(Continued)

*Primary Examiner* — Dion R. Ferguson
(74) *Attorney, Agent, or Firm* — Rimon P.C.

(57) ABSTRACT

A capacitor includes a capacitor element, a bus bar, and an exterior body. The bus bar is exposed from the exterior body, and includes a joint terminal having a flat-plate shape that is to be joined to external terminal. A partial region on a surface of the joint terminal is served as a junction portion to be welded when external terminals are joined. The surface of the joint terminal is provided with an explicit portion that explicitly indicate a region of the junction portion.

7 Claims, 17 Drawing Sheets

(56) References Cited

U.S. PATENT DOCUMENTS

| | | | | |
|---|---|---|---|---|
| 2026/0058057 | A1* | 2/2026 | Takeoka | H01G 2/103 |
| 2026/0120953 | A1* | 4/2026 | Yokota | H01G 2/10 |

FOREIGN PATENT DOCUMENTS

| | | | | |
|---|---|---|---|---|
| WO | WO-2022009680 | A1 * | 1/2022 | H01G 4/38 |
| WO | WO-2022158267 | A1 * | 7/2022 | H01G 2/08 |

OTHER PUBLICATIONS

WO ’853 translation (Year: 2017).*
WO ’680 translation (Year: 2022).*
WO ’267 translation (Year: 2022).*

* cited by examiner

CAPACITOR AND METHOD FOR MANUFACTURING CAPACITOR

BACKGROUND

1. Technical Field

The present disclosure relates to a capacitor and a method for manufacturing the capacitor.

2. Description of the Related Art

Conventionally, there has been known a capacitor that has moisture resistance and impact resistance enhanced by covering a capacitor element and a bus bar connected to an electrode of the capacitor element with an exterior body made of a resin. Such capacitor includes a type having an exterior body made of a resin filled in a case and the case located outside the exterior body, and a type having an exterior body formed by resin molding using a casting mold and no case outside the exterior body. In such capacitor, a joint terminal is provided at a portion of the bus bar exposed from the exterior body, and an external terminal provided in an external apparatus is joined to the joint terminal.

As one method for joining the joint terminal with the external terminal, for example, a method by welding can be used. In this case, the joint terminal is provided with one or a plurality of junction portions. The external terminal is overlaid on the joint terminal, and welded at a position of the junction portion. In this way, the joint terminal and the external terminal are joined. A capacitor module as an example of such capacitor is described in Unexamined Japanese Patent Publication No. 2015-220789.

In the capacitor module of Unexamined Japanese Patent Publication No. 2015-220789, a plate-shaped welding terminal (bus bar) has an erected portion (joint terminal) at a part thereof projecting from a potting resin (exterior body). At an end of the erected portion, a welded portion (junction portion) is provided to project from the end. When a terminal (external terminal) of another component (external apparatus) is joined to the erected portion of the welding terminal, a part of the erected portion including the welded portion and the terminal (external terminal) of the other component are stacked in a thickness direction thereof, and welded at a position of the welded portion.

SUMMARY

A first aspect of the present disclosure relates to a capacitor. The capacitor according to the present aspect includes a capacitor element having an electrode, a bus bar connected to the electrode, and an exterior body that includes a resin material and covers the capacitor element and a part of the bus bar. Here, the bus bar includes a joint terminal having a flat-plate shape. The joint terminal is exposed from the exterior body and is to be joined with an external terminal. A partial region on a surface of the joint terminal is served as a junction portion where welding, deposition, or brazing is performed when the external terminal is joined. The surface of the joint terminal includes an explicit portion that explicitly indicates the region of the junction portion.

A second aspect of the present disclosure relates to a capacitor. The capacitor according to the present aspect includes a capacitor element having an electrode, a bus bar connected to the electrode, and an exterior body that includes a resin material and covers the capacitor element and a part of the bus bar. Here, the bus bar includes a joint terminal having a flat-plate shape. The joint terminal is exposed from the exterior body and is to be joined with an external terminal. A partial region on a surface of the joint terminal is served as a junction portion where welding, deposition, or brazing is performed when the external terminal is joined. The surface of the joint terminal includes the region of the junction portion that is covered with a detachable protection member.

A third aspect of the present disclosure relates to a method for manufacturing a capacitor. A method for manufacturing a capacitor according to the present aspect includes: a housing step of housing a capacitor element module into a case having an opening through the opening, the capacitor element module including a capacitor element having an electrode and a bus bar connected to the electrode; a resin injection step of injecting a liquid-phase resin into the case housing the capacitor element module through the opening; and a resin curing step of curing the liquid-phase resin in the case to form an exterior body covering the capacitor element module. Here, the bus bar includes a joint terminal having a flat-plate shape. The joint terminal is to be joined with an external terminal. A partial region on a surface of the joint terminal is served as a junction portion where welding, deposition, or brazing is performed when the external terminal is joined. In the resin injection step, the capacitor element and the bus bar are buried in the liquid-phase resin such that the joint terminal is exposed from a liquid level face of the liquid-phase resin that is to be a casting face of the exterior body. The resin injection step and the resin curing step are performed in a state where a region of the junction portion is covered with a detachable protection member.

A fourth aspect of the present disclosure relates to a method for manufacturing a capacitor. A method for manufacturing a capacitor according to the present aspect includes: a housing step of housing a capacitor element module into a casting mold having an opening through the opening, the capacitor element module including a capacitor element having an electrode and a bus bar connected to the electrode; a resin injection step of injecting a liquid-phase resin into the casting mold housing the capacitor element module through the opening; and a resin curing step of curing the liquid-phase resin in the casting mold to form an exterior body covering the capacitor element module. Here, the bus bar includes a joint terminal having a flat-plate shape. The joint terminal is to be joined with an external terminal. A partial region on a surface of the joint terminal is served as a junction portion where welding, deposition, or brazing is performed when the external terminal is joined. In the resin injection step, the capacitor element and the bus bar are buried in the liquid-phase resin such that the joint terminal is exposed from a liquid level face of the liquid-phase resin that to be a casting face of the exterior body. The resin injection step and the resin curing step are performed in a state where a region of the junction portion is covered with a detachable protection member.

According to the present disclosure, it is possible to provide the capacitor that can be easily inspected for presence or absence of adhesion of foreign matter to a junction portion of a joint terminal. Further, according to the present disclosure, it is possible to provide the capacitor capable of preventing the adhesion of the foreign matter to the junction portion of the joint terminal, and the method for manufacturing the capacitor.

Effects or meanings of the present disclosure will be further clarified by the description of exemplary embodiments shown below. However, the exemplary embodiments shown below are merely examples when the present disclosure is implemented, and the present disclosure is not limited to the description in the following exemplary embodiments at all.

DETAILED DESCRIPTIONS OF EMBODIMENTS

Figure 1:
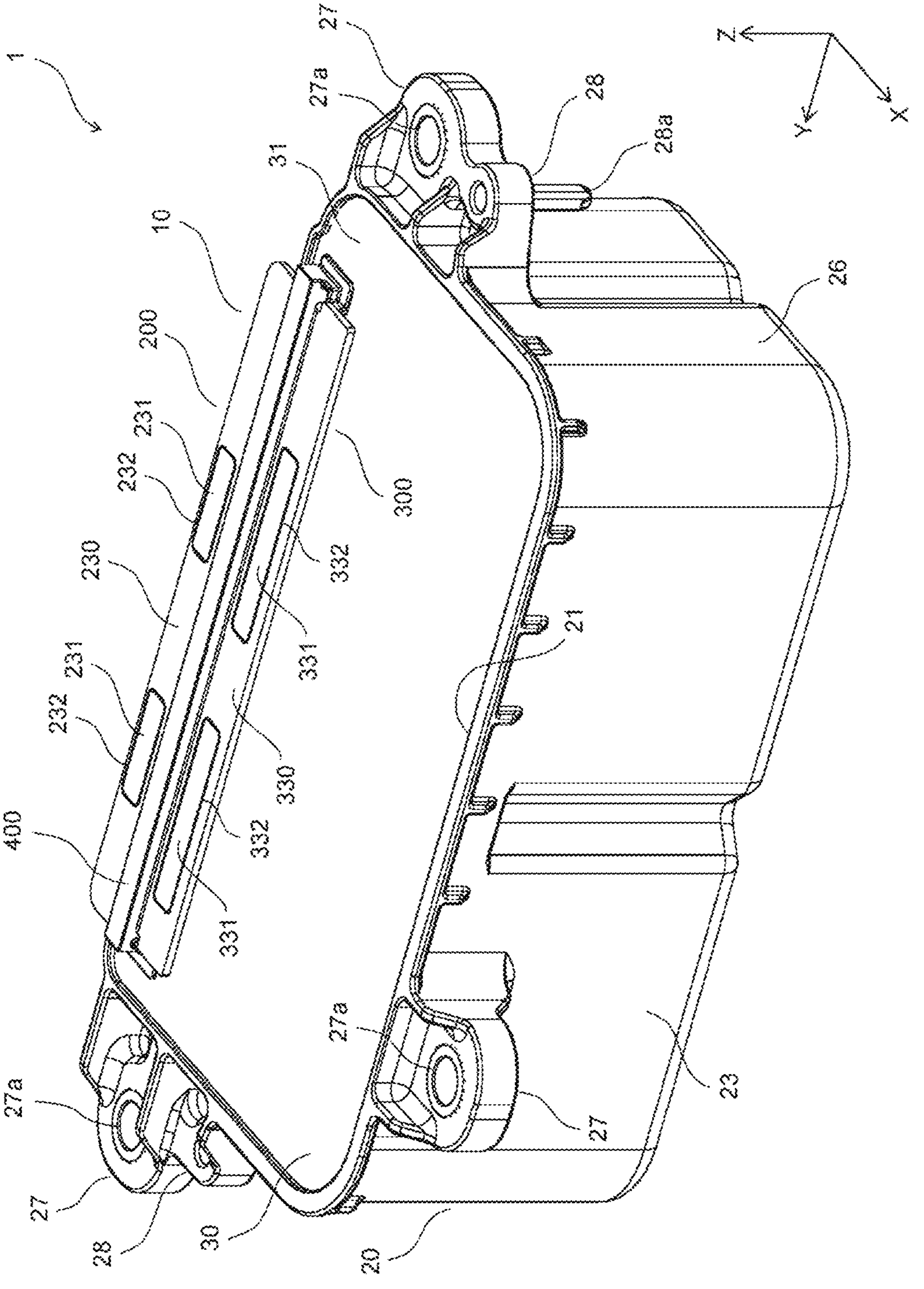
FIG. 1 is a perspective view illustrating a film capacitor according to a first exemplary embodiment.

Hereinafter, problems of the prior art will be briefly described.

In a case where the joint terminal and the external terminal are joined by the welding as described above, if foreign matter adheres to the junction portion of the joint terminal, the foreign matter may hinder the welding. In particular, in a manufacturing process of the capacitor, when the exterior body is made of the resin in the case or the casting mold, bubbles contained in a liquid-phase resin may burst near a liquid level, the resin may splash from the liquid level, and the splashing resin may adhere to the junction portion, which may hinder the welding.

Therefore, in the completed capacitor, it is conceivable to inspect whether or not there is no adhesion of the foreign matter to the junction portion of the joint terminal.

In the capacitor module of Unexamined Japanese Patent Publication No. 2015-220789 described above, the welded portion has a projecting shape projecting from the end of the erected portion. Therefore, the welded portion and other parts of the erected portion can be easily distinguished clearly, and an inspector can easily grasp the welded portion during the inspection of the adhesion of the foreign matter.

However, depending on the capacitor, a configuration may be adopted in which a partial region on a surface of the joint terminal having a flat-plate shape is set as the junction portion. In a case of such configuration, it is difficult to distinguish between the region of the junction portion and other regions on the surface of the joint terminal, and thus, it may be difficult for the inspector to grasp the junction portion and perform the inspection.

Further, it is more desirable that in a process until the external terminal is joined to the junction portion of the joint terminal, such as the manufacturing process of the capacitor, if the adhesion of the foreign matter to the junction portion can be prevented, because inspection of presence or absence of the adhesion of the foreign matter becomes unnecessary.

The above problems may similarly occur also in a capacitor having the joint terminal and the external terminal joined by brazing or deposition.

Therefore, the present disclosure provides a capacitor that can be easily inspected for presence or absence of adhesion of foreign matter to a junction portion of a joint terminal. Further, the present disclosure provides a capacitor capable of preventing adhesion of foreign matter to a junction portion of a joint terminal, and a method for manufacturing the capacitor.

Hereinafter, the film capacitor according to one exemplary embodiment of the capacitor of the present disclosure will be described with reference to the drawings. Note that, for the sake of convenience, an X-axis, a Y-axis, and a Z-axis perpendicular to each other are added to each of the drawings.

First Exemplary Embodiment

Film capacitor 1 according to the first exemplary embodiment will be described. Film capacitor 1 is a so-called case-molded capacitor.

Figure 2:
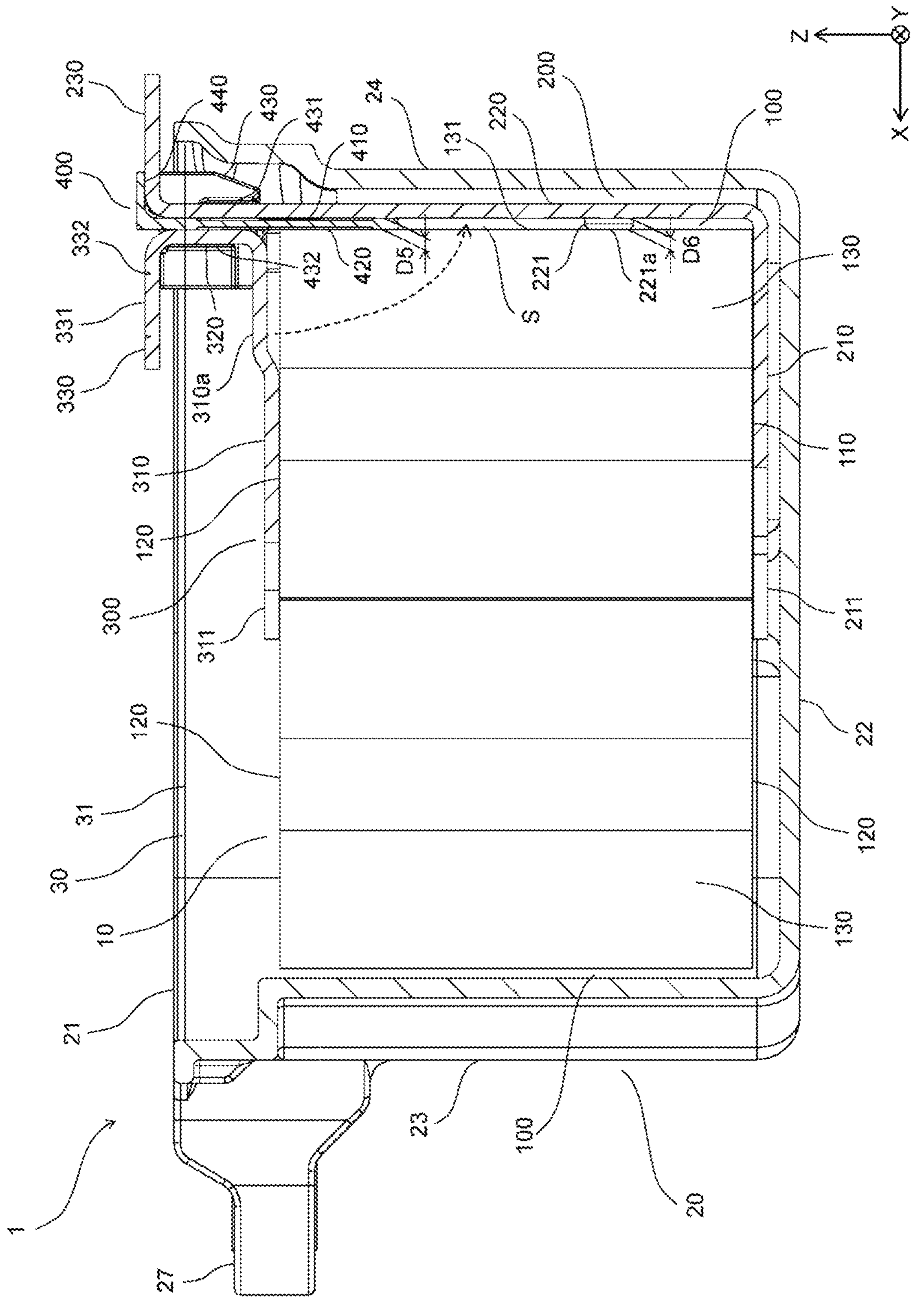
FIG. 2 is a cross-sectional view illustrating the film capacitor according to the first exemplary embodiment cut in parallel with an XZ plane at a center in a Y-axis direction.

FIG. 1 is a perspective view of film capacitor 1. FIG. 2 is a cross-sectional view of film capacitor 1 cut in parallel with the XZ plane at the center in the Y-axis direction. Note that, in FIG. 2, filler resin 30 is illustrated in a transparent state for the sake of convenience.

Film capacitor 1 includes capacitor element module 10, case 20, and filler resin 30. Capacitor element module 10 is housed in case 20, and case 20 is filled with filler resin 30.

Filler resin 30 is a thermosetting resin such as an epoxy resin. Filler resin 30 is an exterior body covering capacitor element module 10 in case 20. A part of capacitor element module 10 buried in filler resin 30 is protected from moisture and impact by case 20 and filler resin 30.

Figure 3:
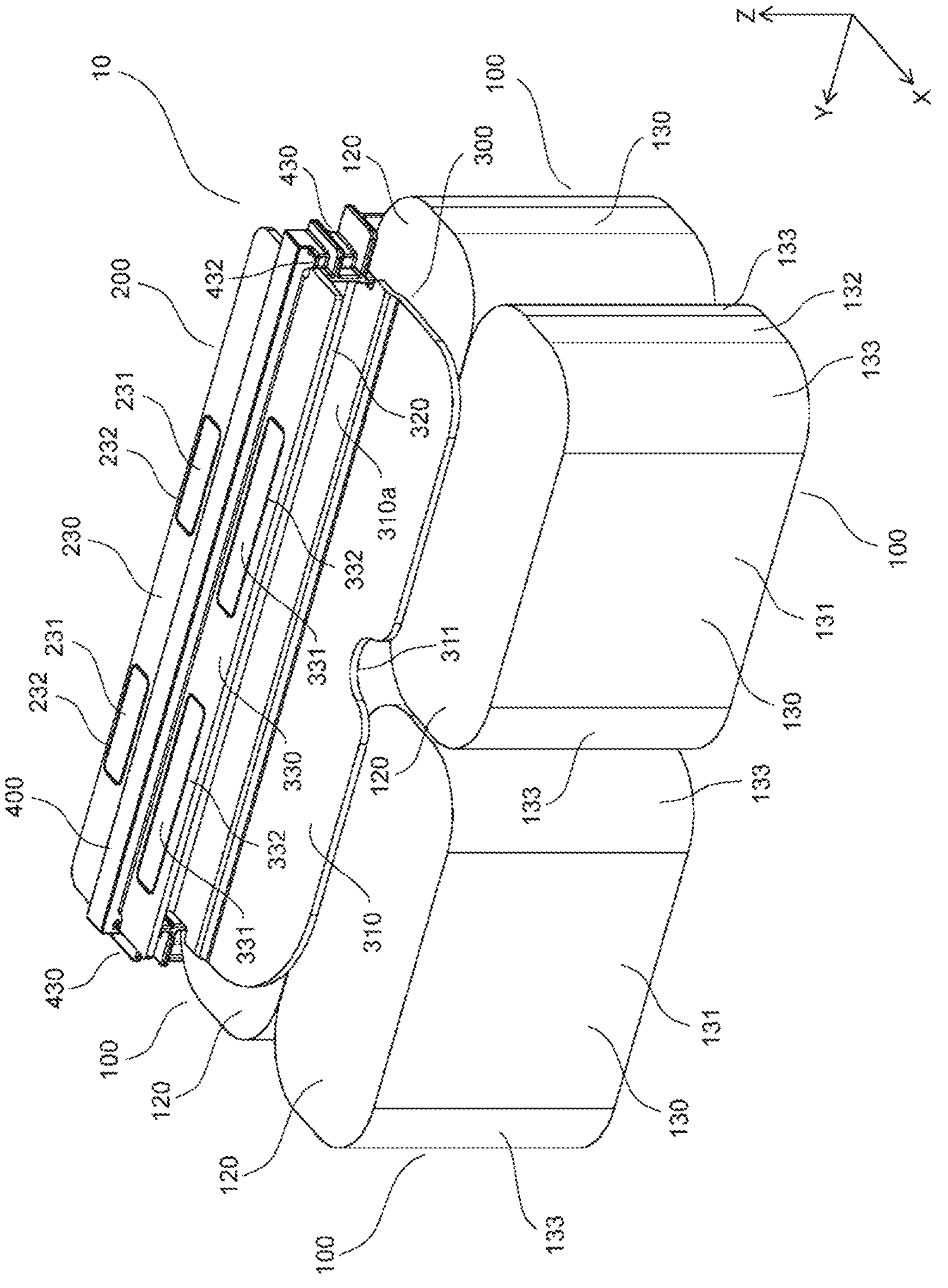
FIG. 3 is a perspective view illustrating a capacitor element module according to the first exemplary embodiment.
Figure 4:
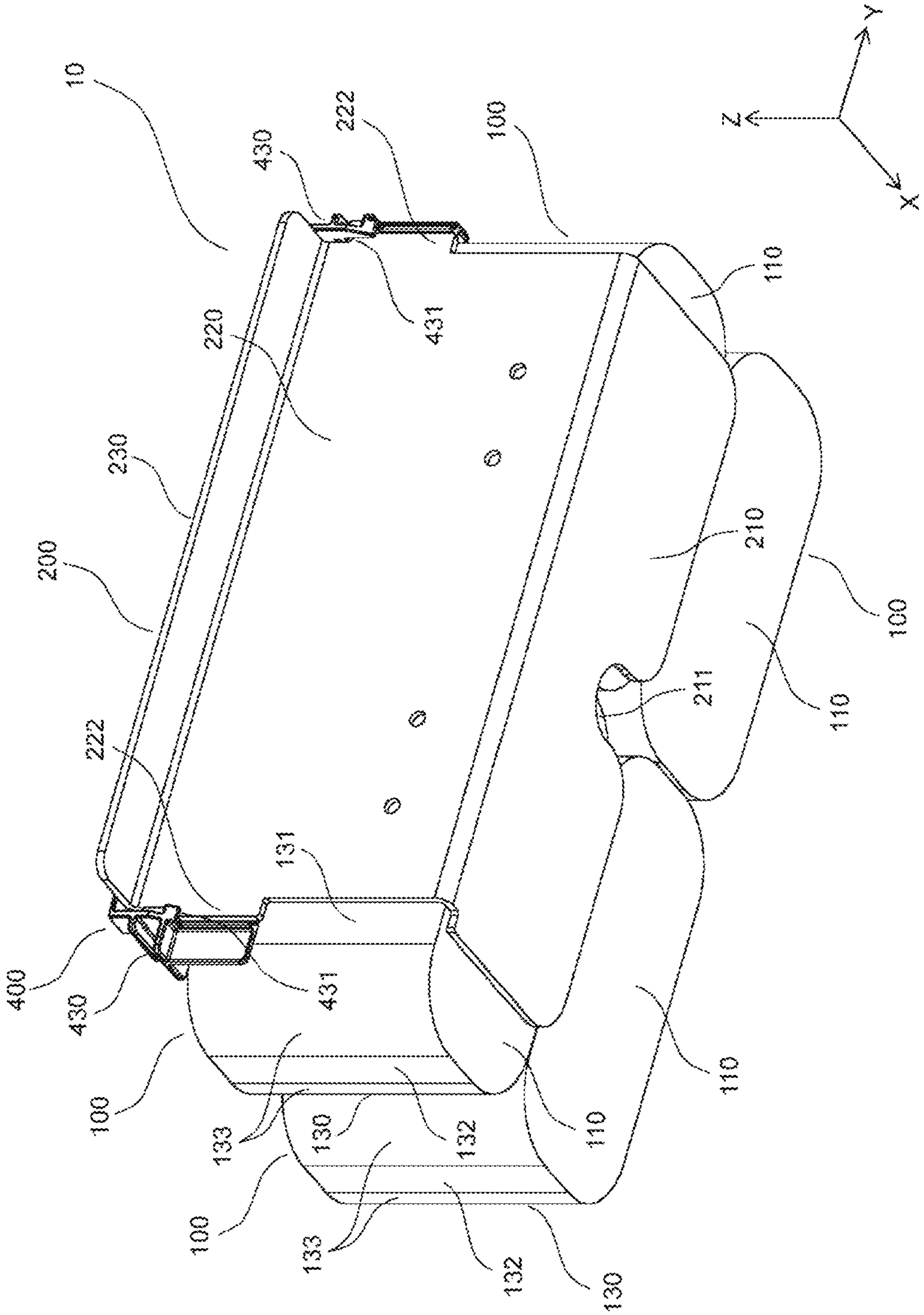
FIG. 4 is a perspective view illustrating the capacitor element module according to the first exemplary embodiment.
Figure 5:
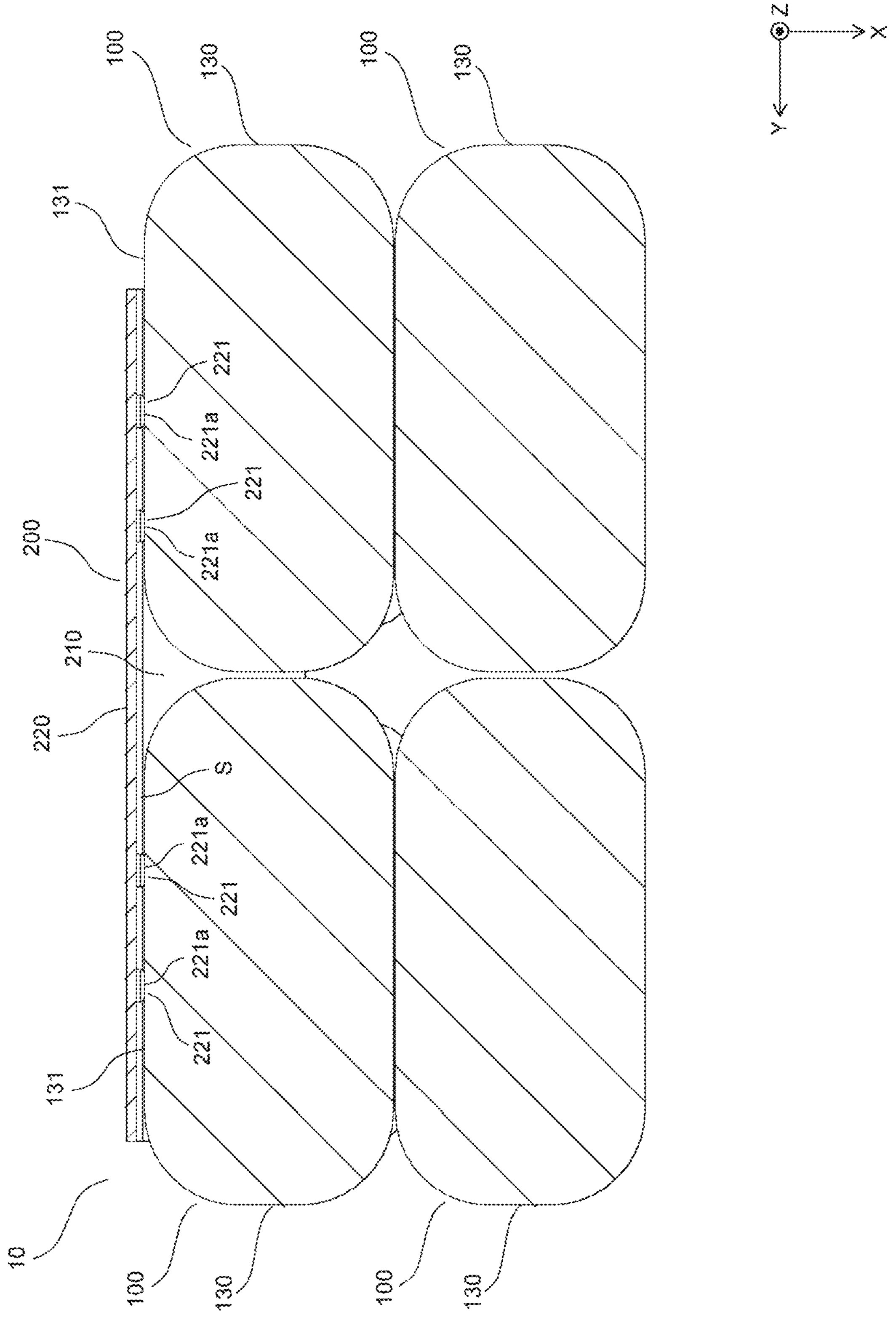
FIG. 5 is a cross-sectional view illustrating the capacitor element module according to the first exemplary embodiment cut in parallel with an XY plane at a position on a Z-axis negative direction side with respect to an insulating member.
Figure 6:
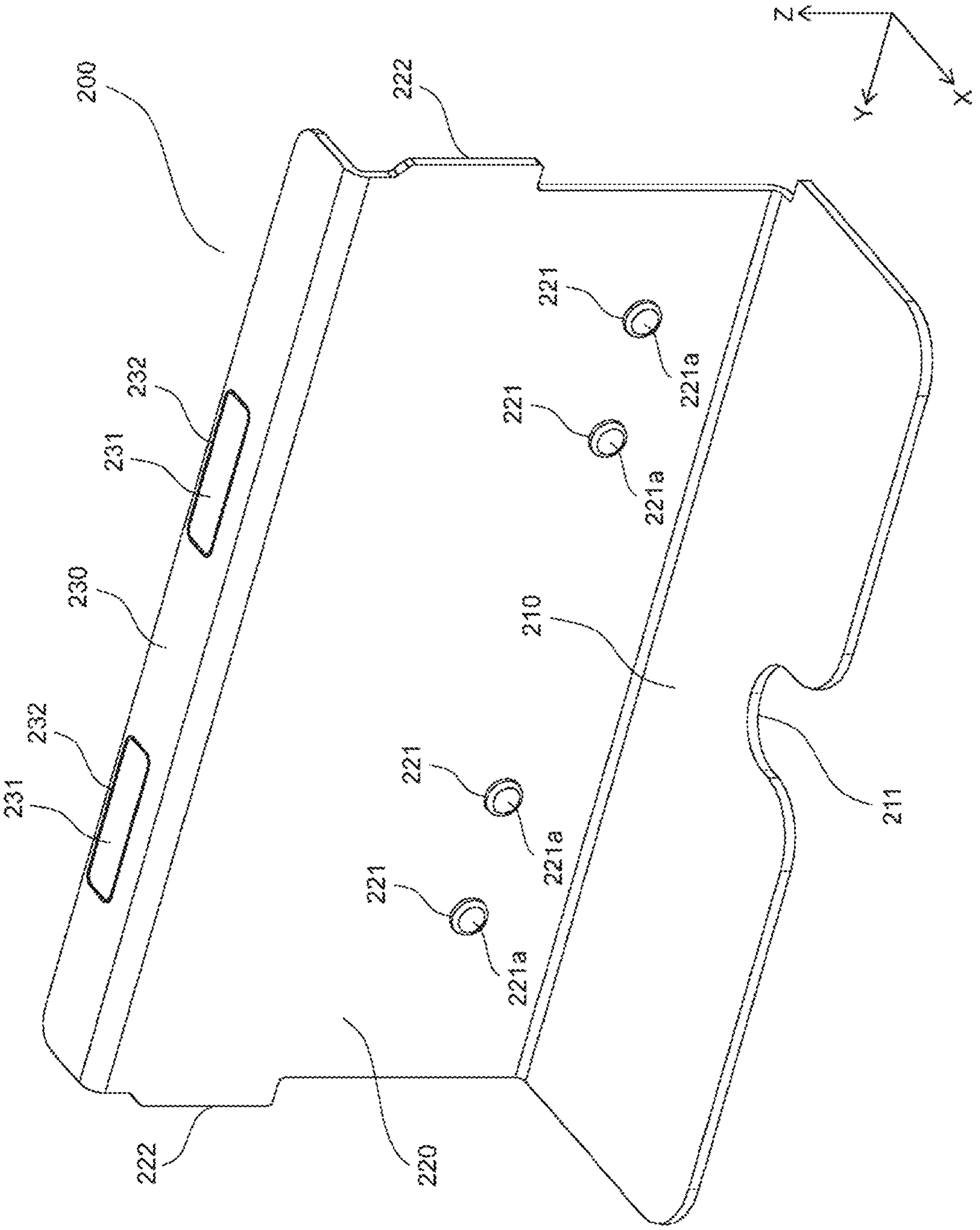
FIG. 6 is a perspective view illustrating a first bus bar according to the first exemplary embodiment.
Figure 7:
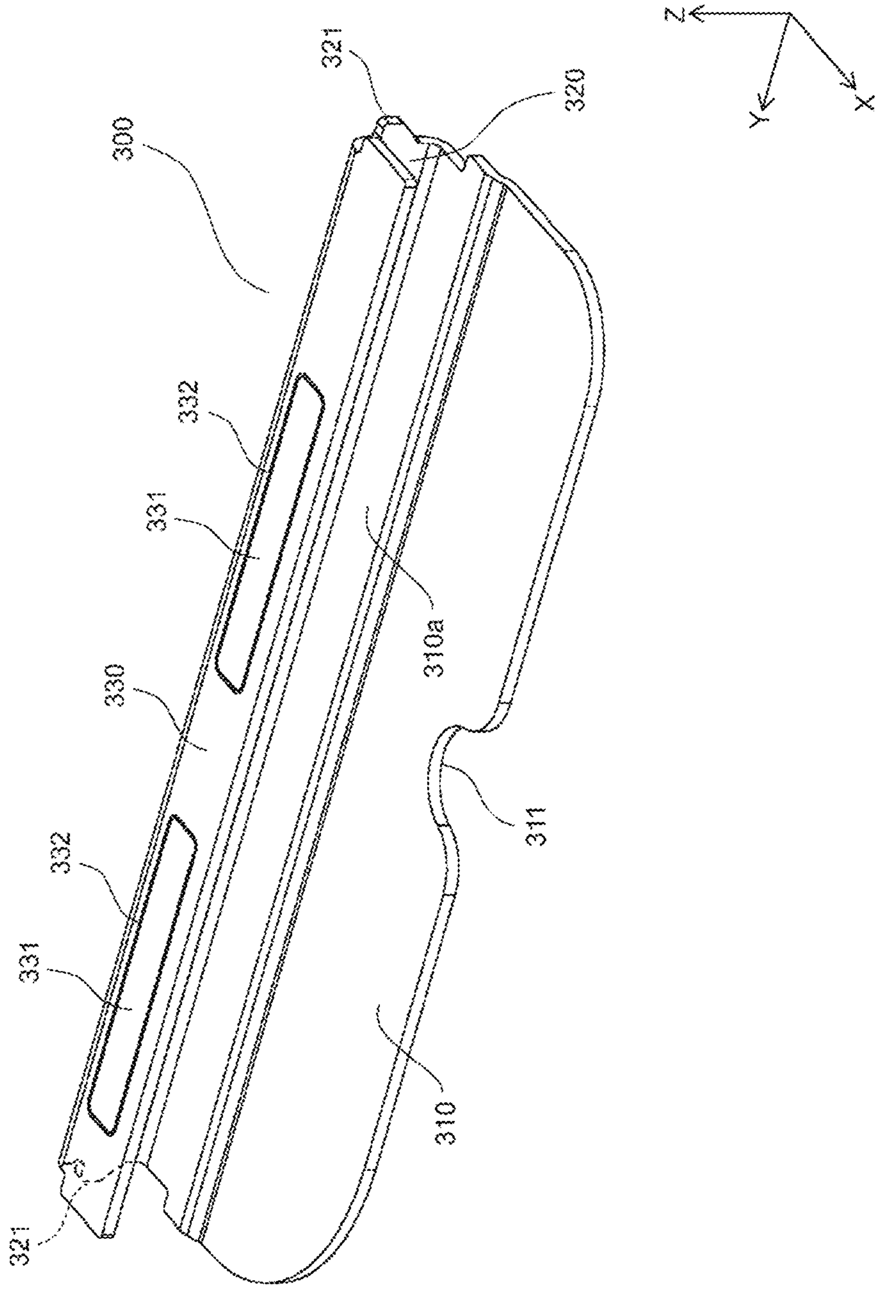
FIG. 7 is a perspective view illustrating a second bus bar according to the first exemplary embodiment.
Figure 8A:
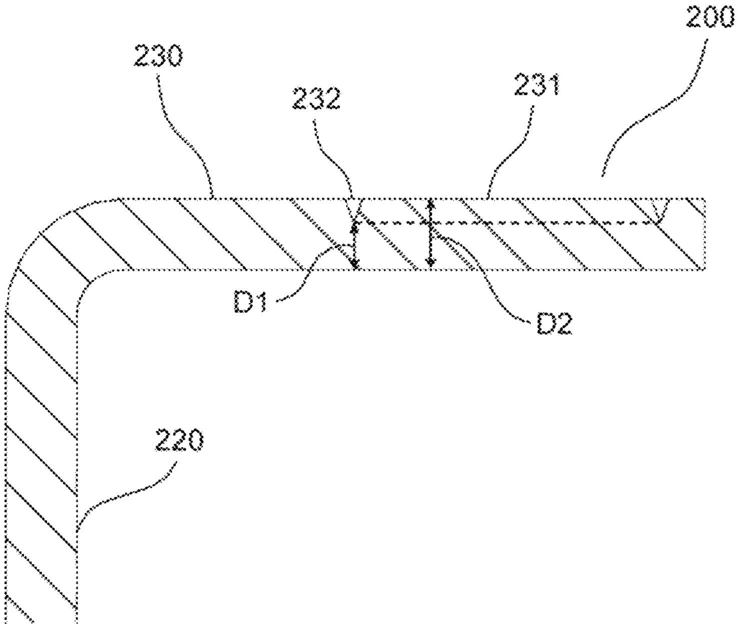
FIG. 8A is a cross-sectional view illustrating a main part of the first bus bar according to the first exemplary embodiment cut at a position of a first junction portion, with a portion illustrated near a first joint terminal.
Figure 8B:
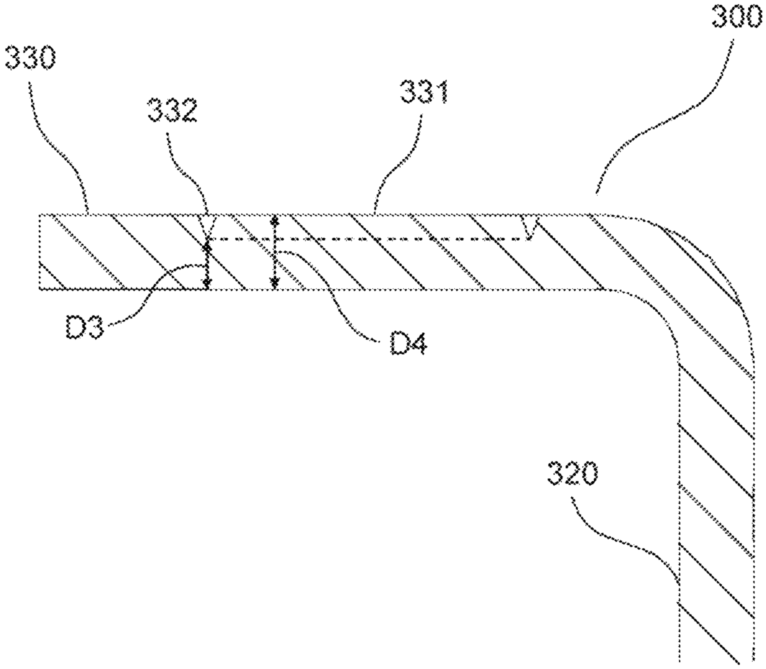
FIG. 8B is a cross-sectional view illustrating a main part of the second bus bar according to the first exemplary embodiment cut at a position of a second junction portion, with a portion illustrated near a second joint terminal.
Figure 9A:
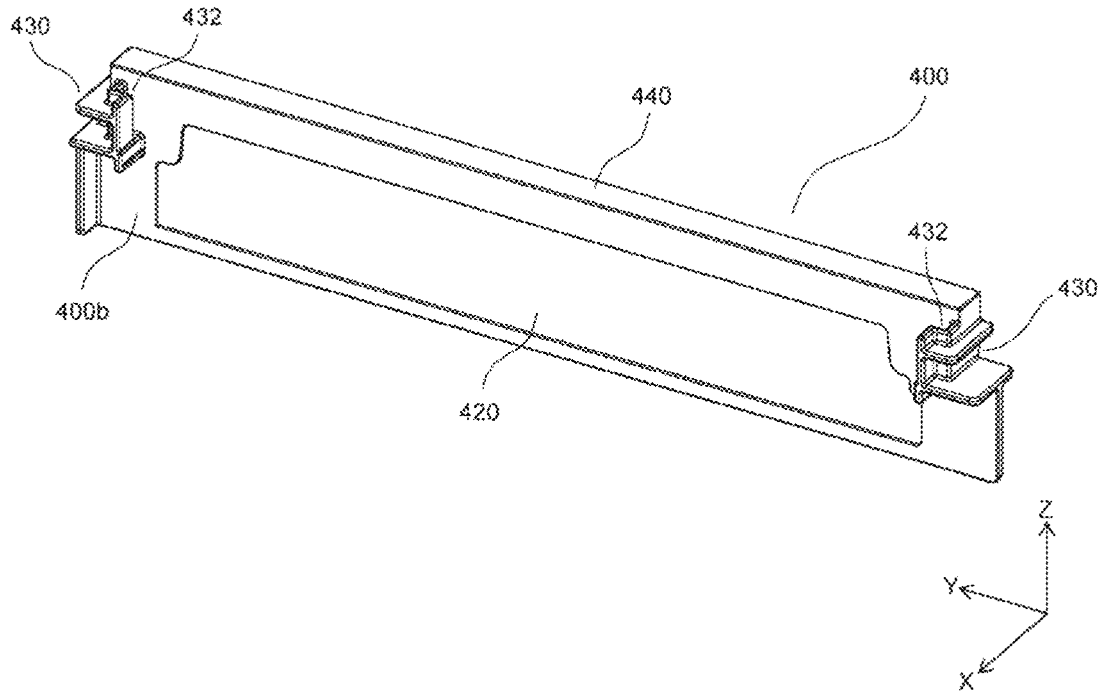
FIGS. 9A and 9B are perspective views illustrating the insulating member according to the first exemplary embodiment.
Figure 9B:
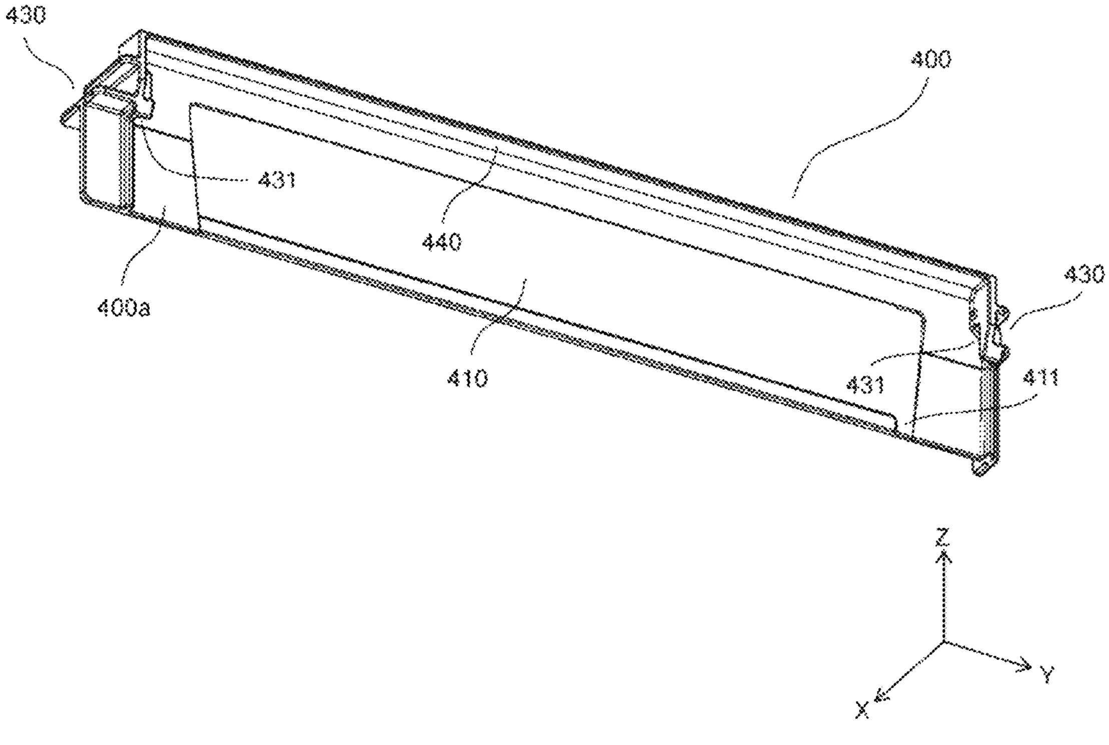

FIG. 3 and FIG. 4 are perspective views of capacitor element module 10. FIG. 5 is a cross-sectional view of capacitor element module 10 cut in parallel with the XY plane at the position on the Z-axis negative direction side with respect to insulating member 400. FIG. 6 is a perspective view of first bus bar 200. FIG. 7 is a perspective view of second bus bar 300. FIG. 8A is a cross-sectional view of a main part of first bus bar 200 cut at a position of first junction portion 231, with a portion illustrated near first joint terminal 230. FIG. 8B is a cross-sectional view of a main part of second bus bar 300 cut at a position of second junction portion 331, with a portion illustrated near second joint terminal 330. FIGS. 9A and 9B are perspective views of insulating member 400.

Capacitor element module 10 includes four capacitor elements 100, first bus bar 200, second bus bar 300, and insulating member 400.

Each of capacitor elements 100 is formed into a shape similar to a flattened oval cylinder by stacking two metallized films each made by having aluminum vapor-deposited on a dielectric film, and winding or laminating and pressing the two metallized films stacked. In each of capacitor elements 100, first electrode 110 is formed on an end face of capacitor element 100 by spraying a metal such as zinc, and second electrode 120 is formed on another end face of capacitor element 100 by similarly spraying the metal such as the zinc.

Each of capacitor elements 100 has peripheral face 130 connecting first electrode 110 and second electrode 120. Peripheral face 130 includes two first planes 131 aligned in an X-axis direction that is a lateral direction of each of capacitor elements 100, two second planes 132 aligned in a Y-axis direction that is a longitudinal direction of each of capacitor elements 100, and four arcuate faces 133 each present between a respective one of first planes 131 and a respective one of second planes 132. A dimension of each of first planes 131 in the Y-axis direction is larger than a dimension of each of second planes 132 in the X-axis direction.

Note that each of capacitor elements 100 according to the present exemplary embodiment is formed with the metallized films made by having the aluminum vapor-deposited on the dielectric film. In addition, each of capacitor elements 100 may be formed with metallized films having another metal such as the zinc or magnesium vapor-deposited. Alternatively, each of capacitor elements 100 may be formed with metallized films made by having a plurality of metals among these metals vapor-deposited, or may be formed with metallized films made by having an alloy of these metals vapor-deposited.

The four capacitor elements 100 are arranged in two rows in each of the X-axis direction and the Y-axis direction such that the peripheral faces 130 face each other. In each of capacitor elements 100, first electrode 110 faces the Z-axis negative direction, and second electrode 120 faces a Z-axis positive direction.

First bus bar 200 is formed by appropriately cutting out and bending a conductive material, for example, a copper plate, and has a configuration having integrated first electrode terminal 210, first relay 220, and first joint terminal 230.

First electrode terminal 210 has a substantially rectangular flat-plate shape elongated in the Y-axis direction. Two corners of first electrode terminal 210 in an X-axis positive direction are formed into a large arc. Notch 211 having a substantially U-shape is formed at a center of an end of first electrode terminal 210 in the X-axis positive direction.

First relay 220 relays between first electrode terminal 210 and first joint terminal 230. First relay 220 has a substantially rectangular flat-plate shape elongated in the Y-axis direction, and extends in the Z-axis positive direction perpendicularly to first electrode terminal 210 from an end of first electrode terminal 210 in an X-axis negative direction. A dimension of first relay 220 in the Z-axis direction is larger than a dimension of each of capacitor elements 100 in the Z-axis direction, that is, a dimension in a direction where first electrode 110 and second electrode 120 are arranged.

In first relay 220, two projections 221 are provided on the X-axis positive direction side of a surface of first relay 220, to be arranged side by side in the Y-axis direction at each of two positions on a Y-axis positive direction side and a Y-axis negative direction side, and the projections are at positions closer to first electrode terminal 210 side than to a center of first relay 220 in the Z-axis direction. Four projections 221 each have a flat, substantially columnar shape and project toward the X-axis positive direction side from the surface of first relay 220 on the X-axis positive direction side. Distal end face 221*a* of each of projections 221 has a flat shape, and an outer peripheral edge of distal end face 221*a* is chamfered in an arc shape. Further, first projecting pieces 222 projecting in the Y-axis positive direction and the Y-axis negative direction are respectively formed near first joint terminal 230 at an end on the Y-axis positive direction side and an end on the Y-axis negative direction side of first relay 220.

First joint terminal 230 has a substantially rectangular flat-plate shape elongated in the Y-axis direction, and extends in the X-axis negative direction perpendicularly to first relay 220 from the end of first relay 220 in the Z-axis positive direction. On an inner portion of a surface of first joint terminal 230, first junction portions 231 welded when the external terminal is joined are set at two positions to be arranged in the Y-axis direction. Then, on the surface of first joint terminal 230, as explicit portions that explicitly indicate the regions of first junction portions 231, first grooves 232 in a substantially rectangular and annular shape are provided, first grooves 232 each explicitly indicating a boundary between the region of each of first junction portions 231 and another region.

As illustrated in FIG. 8A, each of first grooves 232 has, for example, a V-shaped cross section. Each of first grooves 232 may have a cross-sectional shape other than a V shape, such as a semicircle, a U shape, or a square shape. Thickness D1 of first joint terminal 230 at the portion of each of first grooves 232 is thinner than thickness D2 of first joint terminal 230 at the portion of each of first junction portions 231.

Second bus bar 300 is formed by appropriately cutting out and bending the conductive material, for example, the copper plate, and has a configuration having integrated second electrode terminal 310, second relay 320, and second joint terminal 330.

Second electrode terminal 310 has a substantially rectangular flat-plate shape elongated in the Y-axis direction, and end 310*a* on the X-axis negative direction side (second relay 320 side) one step higher in the Z-axis direction. Two corners of second electrode terminal 310 in the X-axis positive direction are formed into a large arc. Notch 311 having a substantially semicircular shape is formed at a center of an end of second electrode terminal 310 in the X-axis positive direction.

Second relay 320 relays between second electrode terminal 310 and second joint terminal 330. Second relay 320 has a substantially rectangular flat-plate shape elongated in the Y-axis direction, and extends in the Z-axis positive direction perpendicularly to second electrode terminal 310 from an end of second electrode terminal 310 in the X-axis negative direction. Second projecting pieces 321 projecting in the Y-axis positive direction and the Y-axis negative direction are respectively formed on the end on the Y-axis positive direction side and the end on the Y-axis negative direction side of second relay 320.

Second joint terminal 330 has a substantially rectangular flat-plate shape elongated in the Y-axis direction, and extends in the X-axis positive direction perpendicularly to second relay 320 from the end of second relay 320 in the Z-axis positive direction. On an inner portion of a surface of second joint terminal 330, second junction portions 331 welded when the external terminal is joined are set at two positions to be arranged in the Y-axis direction. Then, on the surface of second joint terminal 330, as explicit portions that explicitly indicate the regions of second junction portions 331, second grooves 332 having a substantially rectangular and annular shape are provided, second grooves 332 each explicitly indicating a boundary between the region of each of second junction portions 331 and another region.

As illustrated in FIG. 8B, each of second grooves 332 has, for example, a V-shaped cross section. Each of second grooves 332 may have a cross-sectional shape other than a V shape, such as a semicircle, a U shape, or a square shape. Thickness D3 of second joint terminal 330 at a portion of each of second grooves 332 is thinner than thickness D4 of second joint terminal 330 at a portion of each of second junction portions 331.

Insulating member 400 is made of an electrically insulating material such as polyphenylene sulfide (PPS), and has a substantially rectangular flat-plate shape elongated in the Y-axis direction. On first surface 400*a* on the X-axis negative direction side and second surface 400*b* on the X-axis positive direction side of insulating member 400, there are formed first recess 410 and second recess 420 in a substantially rectangular shape elongated in the Y-axis direction and recessed into these surfaces, respectively. Passage 411 extending to an end of insulating member 400 on the Z-axis negative direction side is provided at an end of first recess 410 on the Y-axis positive direction side.

Insulating member 400 is provided with holders 430 at both ends in the Y-axis direction. Each of holders 430 is provided with first fitting groove 431 opened in the Z-axis negative direction and the Y-axis direction on first surface 400*a* side, and is provided with second fitting groove 432 opened in the Z-axis positive direction and the Y-axis direction on second surface 400*b* side. Further, insulating member 400 has an end in the Z-axis positive direction that is provided with caves 440 extending in the X-axis negative direction.

In capacitor element module 10, first electrode terminal 210 of first bus bar 200 is in contact with first electrodes 110 of the four capacitor elements 100 from the Z-axis negative direction side. First electrode terminal 210 and four first electrodes 110 are joined by a joining method such as welding or soldering. In this way, first bus bar 200 is electrically connected to the four first electrodes 110.

Second electrode terminal 310 of second bus bar 300 is in contact with second electrodes 120 of the four capacitor elements 100 from the Z-axis positive direction side. There is a gap between end 310*a* of second electrode terminal 310 and second electrodes 120. Second electrode terminal 310 and four second electrodes 120 are joined by a joining method such as welding or soldering. In this way, second bus bar 300 is electrically connected to the four second electrodes 120.

First relay 220 of first bus bar 200 faces first planes 131 of peripheral faces 130 of two capacitor elements 100 on the X-axis negative direction side from the X-axis negative direction side over the entire area between first electrodes 110 and second electrodes 120. Distal end faces 221*a* of two projections 221 on the Y-axis positive direction side of first relay 220 is in contact with first planes 131 of capacitor elements 100 on the Y-axis positive direction side at a position closer to first electrodes 110 than to second electrodes 120. Similarly, distal end faces 221*a* of two projections 221 on the Y-axis negative direction side of first relay 220 is in contact with first planes 131 of capacitor elements 100 on the Y-axis negative direction side at a position closer to first electrodes 110 than to second electrodes 120.

A portion of insulating member 400 on the Z-axis positive direction side is interposed between first relay 220 of first bus bar 200 and second relay 320 of second bus bar 300 in a state of being in contact with first relay 220 and second relay 320. In addition, a portion of insulating member 400 on the Z-axis negative direction side is interposed between first relay 220 of first bus bar 200 and first planes 131 of the two capacitor elements 100 on the X-axis negative direction side in a state of being in contact with first relay 220 and first planes 131. In this way, insulation between first relay 220 or second relay 320 and second electrodes 120 is secured.

Thickness D5 of insulating member 400 is equal to projection length D6 of each of the four projections 221 of first relay 220 (see FIG. 2). In this way, first planes 131 of the two capacitor elements 100 and first relay 220 become parallel to each other. Gap S being uniform and having a constant width (width corresponding to thickness D5 and projection length D6) is secured between first planes 131 of the two capacitor elements 100 and first relay 220. A distance between the two capacitor elements 100 and first relay 220 is kept constant, that is, variation in the distance is suppressed, whereby electrical characteristics of film capacitor 1 are less likely to vary.

First projecting pieces 222 of first relay 220 are fitted into first fitting groove 431 of holder 430 of insulating member 400 from the Z-axis negative direction side, and first joint terminal 230 is in contact with caves 440 of insulating member 400 from the Z-axis negative direction side. Second projecting pieces 321 of second relay 320 are fitted into second fitting groove 432 of holder 430 of insulating member 400 from the Z-axis negative direction side, and second joint terminal 330 is in contact with holder 430 from the Z-axis positive direction side. This makes it difficult for first bus bar 200, second bus bar 300, and insulating member 400 to be separated in the X-axis direction, the Y-axis direction, and the Z-axis direction.

Figure 10:
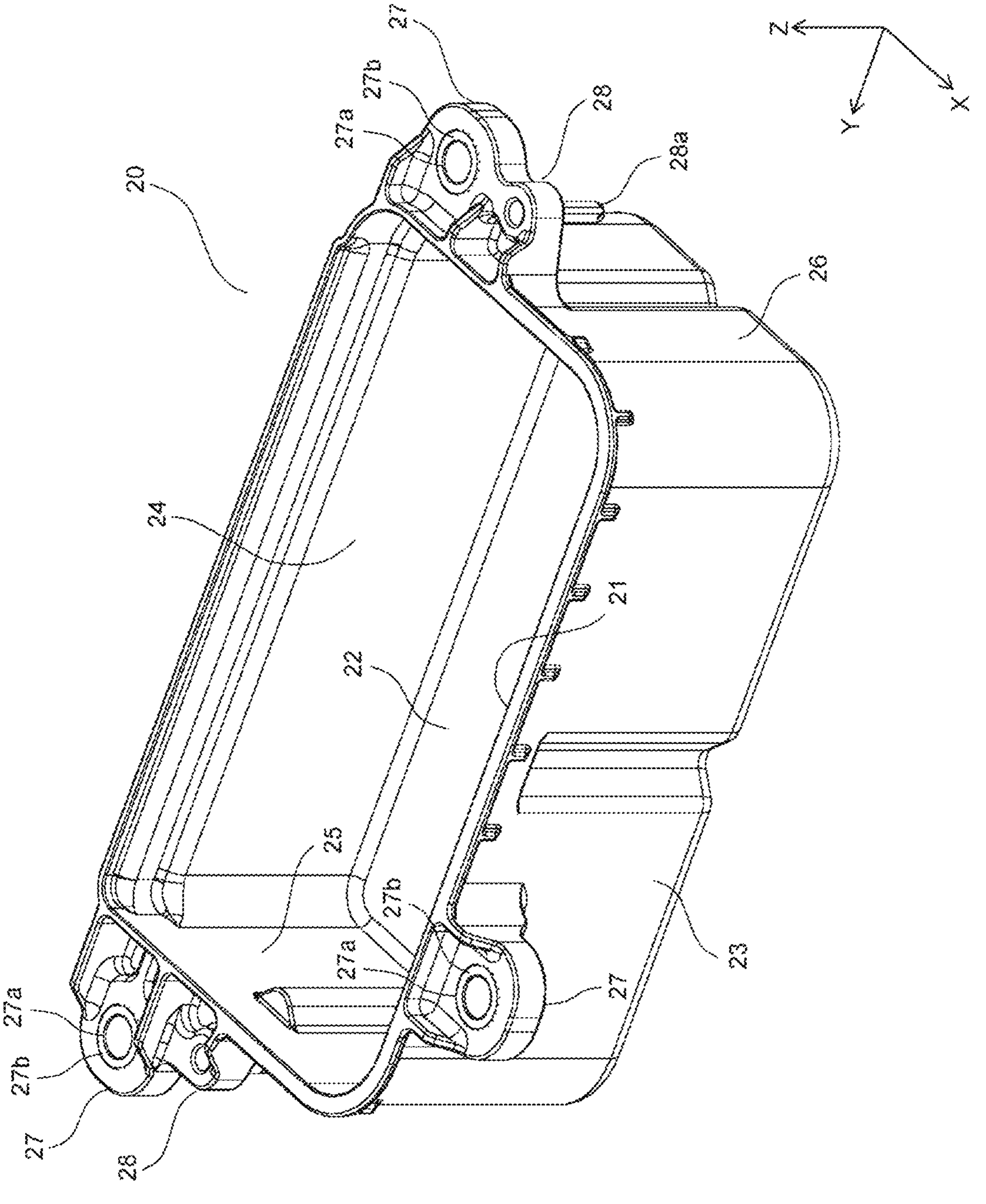
FIG. 10 is a perspective view illustrating a case according to the first exemplary embodiment.

FIG. 10 is a perspective view of case 20.

Case 20 is made of a resin material, for example, a thermoplastic resin such as polyphenylene sulfide (PPS). Case 20 may be made of the thermosetting resin such the epoxy resin.

Case 20 has a substantially rectangular parallelepiped box shape, and includes: opening 21 having a substantially rectangular shape; bottom face 22 having a substantially rectangular shape that faces opening 21; first side face 23 and second side face 24 having a substantially rectangular shape that extend from both ends of bottom face 22 on the X-axis direction side toward opening 21 side (Z-axis positive direction) and face each other; and third side face 25 and fourth side face 26 having a rectangular shape that extend from the both ends of bottom face 22 on the Y-axis direction side toward opening 21 side (Z-axis positive direction) and face each other.

On first side face 23, third side face 25, and fourth side face 26, attachment tabs 27 are provided. Each of attachment tabs 27 has insertion hole 27*a*. Into insertion hole 27*a*, metal collar 27*b* is fitted for increasing a strength of the hole. Further, on third side face 25 and fourth side face 26, positioning tabs 28 are provided. Each of positioning tabs 28 has a positioning pin 28*a* projecting toward bottom face 22 side. When film capacitor 1 is installed in an installation portion of the external apparatus, each of attachment tabs 27 is fixed to the installation portion by bolts or the like. At this time, in order to position film capacitor 1 with respect to the installation portion, positioning pin 28*a* is inserted into a positioning hole provided in the installation portion.

In case 20, capacitor element module 10 is disposed such that first electrodes 110 of the four capacitor elements 100 face bottom face 22 of case 20. First relay 220 of first bus bar 200 extends from bottom face 22 side toward opening 21 side along second side face 24 of case 20, and is led out of filler resin 30 from casting face 31 of filler resin 30. First joint terminal 230 of first bus bar 200 is exposed from filler resin 30. In addition, second relay 320 of second bus bar 300 is led out of filler resin 30 from casting face 31, and second joint terminal 330 of second bus bar 300 is exposed from filler resin 30.

When film capacitor 1 is assembled, first, the housing step is performed, and capacitor element module 10 is housed in case 20 through opening 21. Capacitor element module 10 is positioned at a predetermined position in case 20 with a positioning jig.

Next, the resin injection step is performed, and filler resin 30 in a liquid phase state is injected into case 20 through opening 21 to fill up to a position close to opening 21. First joint terminal 230 of first bus bar 200 and second joint terminal 330 of second bus bar 300 are exposed from a liquid level fear of filler resin 30 in the liquid phase state as casting face 31 after curing.

Between first planes 131 of the two capacitor elements 100 on the X-axis negative direction side and first relay 220 of first bus bar 200, gap S having a constant width is secured with insulating member 400 and the four projections 221. Therefore, the injected filler resin 30 easily enters into gap S, gap S is sufficiently filled with filler resin 30, and air hardly remains in gap S. In particular, filler resin 30 not only enters into gap S from both sides of first relay 220 in the Y-axis direction, but also enters into a gap between end 310*a* of second electrode terminal 310 of second bus bar 300 and second electrodes 120 of the two capacitor elements 100 on the X-axis negative direction side and a gap between two second electrodes 120 as indicated by a broken line arrow in FIG. 2, so that filler resin 30 easily spreads over gap S.

In addition, the injected filler resin 30 enters into first recess 410 and second recess 420 of insulating member 400, and first recess 410 and second recess 420 are filled with filler resin 30.

Further, capacitor element module 10 is provided with notch 211 of first electrode terminal 210 of first bus bar 200 and notch 311 of second electrode terminal 310 of second bus bar 300 to coincide with spaces present in centers of the four capacitor elements 100 (see FIGS. 3 and 4). Therefore, the injected filler resin 30 easily spreads between capacitor element module 10 and bottom face 22 of case 20 through two notches 211, 311 and the spaces in the centers.

When case 20 is filled with filler resin 30, the resin curing step is performed, heating is performed in case 20 to heat filler resin 30. In this way, filler resin 30 is cured in case 20. Filler resin 30 serves as the exterior body covering capacitor element module 10.

Thus, as illustrated in FIG. 1, film capacitor 1 is completed.

Peripheral faces 130 of the two capacitor elements 100 on the X-axis negative direction side and first relay 220 are bonded to each other with filler resin 30 present in gap S therebetween. At this time, since filler resin 30 present in gap S is secured to have a constant thickness, peeling is less likely to occur between peripheral face 130 of each of capacitor elements 100 and filler resin 30 and between first relay 220 and filler resin 30. In addition, since gap S is hardly narrowed, a cavity (void) is hardly generated in filler resin 30 present in gap S. Accordingly, the moisture resistance of film capacitor 1 can be improved because the moisture resistance is less likely to decrease due to moisture entering into a peeled portion or the cavity. Further, first relay 220 and insulating member 400 are bonded with filler resin 30 in first recess 410, and second relay 320 and insulating member 400 are bonded with filler resin 30 in second recess 420. In this way, the moisture is less likely to enter between first relay 220 and insulating member 400 and between second relay 320 and insulating member 400, and the moisture resistance of film capacitor 1 is further improved.

When filler resin 30 in the liquid phase state is injected into case 20 by the resin injection step, air is caught, so that a large number of bubbles can be generated in filler resin 30 in the liquid phase state in case 20. These bubbles may burst near the liquid level face, and the resin may splash from the liquid level face. The splashing resin may adhere to first junction portions 231 of first joint terminal 230 and second junction portions 331 of second joint terminal 330 present near the liquid level face. Further, in various steppes until film capacitor 1 is completed, foreign matter such as dust may adhere to first junction portions 231 and second junction portions 331.

When the external terminal is joined to first joint terminal 230 and second joint terminal 330, welding is performed in the regions of first junction portions 231 and second junction portion s 331. Therefore, in the completed film capacitor 1, if the foreign matter such as the resin or the dust adheres to first junction portions 231 or second junction portions 331, the welding may be hindered.

Therefore, in the completed film capacitor 1, whether or not the foreign matter adheres to first junction portions 231 or second junction portions 331 is inspected. In film capacitor 1 of the present exemplary embodiment, on the surface of first joint terminal 230, the boundary between the region of each of first junction portions 231 and the other region is explicitly indicated by a respective one of first grooves 232 that is an explicit portion. Similarly, on the surface of second joint terminal 330, the boundary between the region of each of second junction portions 331 and the other region is explicitly indicated by a respective one of second grooves 332 that is an explicit portion. Therefore, the inspector can easily grasp first junction portions 231 and second junction portions 331, and can easily inspect the presence or the absence of the adhesion of the foreign matter. Then, the inspector can easily find the adhesion of the foreign matter, particularly the resin, to first junction portions 231 and second junction portions 331.

Film capacitor 1 is installed in the external apparatus. The external apparatus is provided with external terminal T1 corresponding to first joint terminal 230 of first bus bar 200 and external terminal T2 corresponding to second joint terminal 330 of second bus bar 300. External terminal T1 is joined to first joint terminal 230 by welding, and external terminal T2 is joined to second joint terminal 330 by welding.

Figure 11:
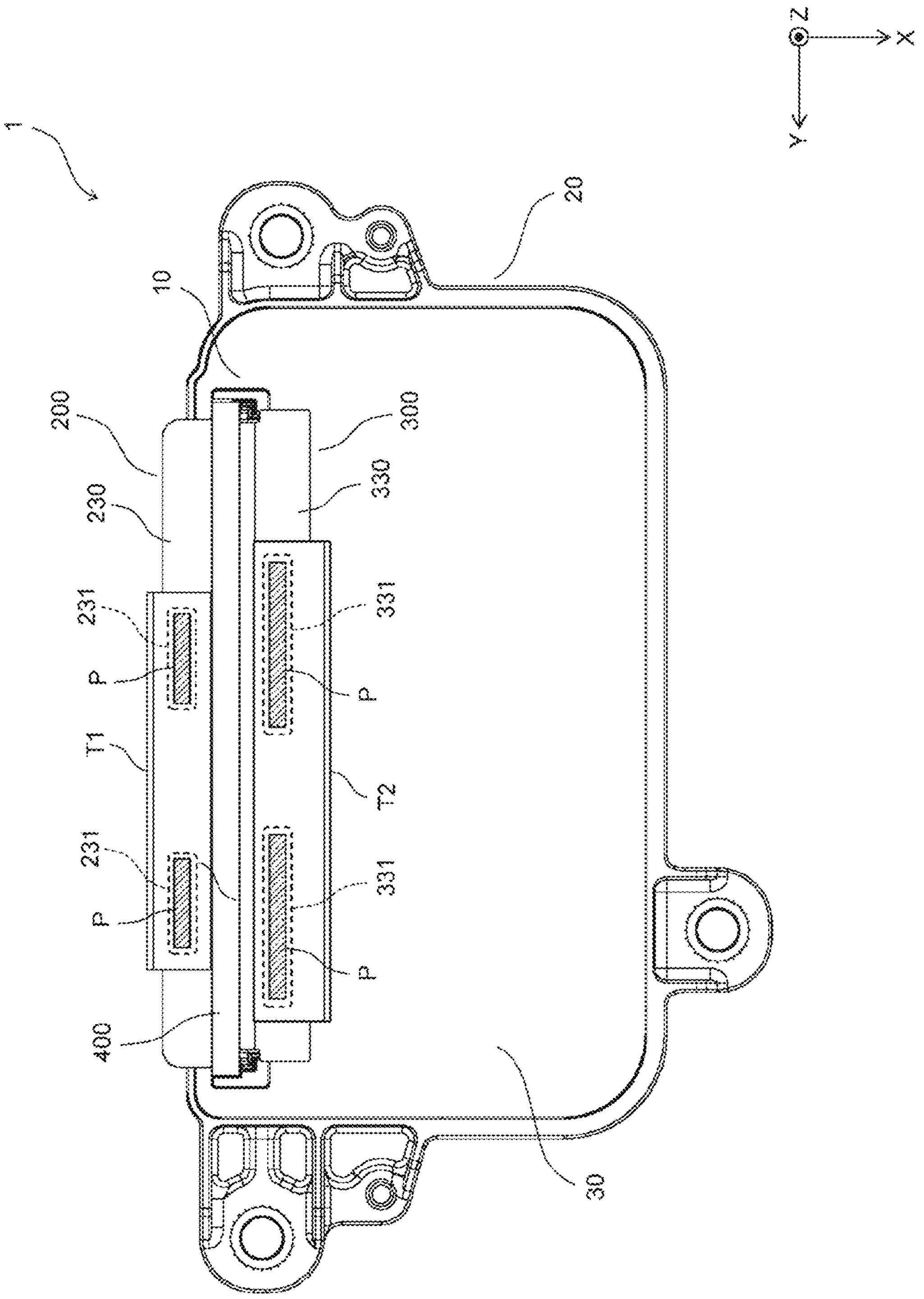
FIG. 11 is a plan view illustrating the film capacitor according to the first exemplary embodiment in a state where an external terminal is joined to the first joint terminal and the second joint terminal.

FIG. 11 is a plan view of film capacitor 1 in a state where external terminals T1, T2 are joined to first joint terminal 230 and second joint terminal 330.

External terminal T1 is stacked on the surface of first joint terminal 230 to cover two first junction portions 231. A joining face of external terminal T1 in contact with first joint terminal 230 is flat. Similarly, external terminal T2 is stacked on the surface of second joint terminal 330 to cover two second junction portions 331. A joining face of external terminal T2 in contact with second joint terminal 330 is flat.

Welding (laser welding, resistance welding, or the like) using welding equipment is performed in the regions of each of first junction portions 231 and each of second junction portions 331. In this way, external terminal T1 is joined to first joint terminal 230, and external terminal T2 is joined to second joint terminal 330.

Actually, welded portion P has a shape elongated in longitudinal directions (Y-axis directions) of first joint terminal 230 and second joint terminal 330. Accordingly, in order to correspond to a shape of welded portion P, each of first junction portions 231 and each of second junction portions 331 have a substantially rectangular shape. In addition, a position of welded portion P may be slightly shifted due to erection tolerance, member tolerance, and the like in film capacitor 1. Accordingly, in consideration of positional deviation of welded portion P, sizes of each of first junction portions 231 and each of second junction portions 331 are made larger than a size of welded portion P. Note that, if the shape of welded portion P is changed, the shapes of each of first junction portions 231 and each of second junction portions 331 can also be changed accordingly.

The explicit portion explicitly indicating each of first junction portions 231 is a respective one of first grooves 232, and does not project from the surface of first joint terminal 230. Accordingly, contact of the joining face of external terminal T1 with the surface of first joint terminal 230 is not hindered by the explicit portion. In addition, thickness D1 of first joint terminal 230 at the portion of each of first grooves 232 is thinner than thickness D2 of first joint terminal 230 at the portion of each of first junction portions 231 (see FIG. 8A). Therefore, since heat is less likely to propagate in the portion of each of first grooves 232, heat generated in each of first junction portions 231 during the welding is less likely to escape from each of first junction portions 231. Accordingly, the welding can be efficiently performed at each of first junction portions 231.

Similarly, the explicit portion explicitly indicating each of second junction portions 331 is a respective one of second grooves 332, and does not project from the surface of second joint terminal 330. Accordingly, contact of the joining face of external terminal T2 with the surface of second joint terminal 330 is not hindered by the explicit portion. In addition, thickness D3 of second joint terminal 330 at the portion of each of second grooves 332 is thinner than thickness D4 of second joint terminal 330 at the portion of each of second junction portions 331 (see FIG. 8B). Therefore, since heat is less likely to propagate in the portion of each of second grooves 332, heat generated in each of second junction portions 331 during the welding is less likely to escape from each of second junction portions 331. Accordingly, the welding can be efficiently performed at each of second junction portions 331.

Note that, since first junction portions 231 and second junction portions 331 are explicitly indicated by first grooves 232 and second grooves 332, it is also possible that the welding equipment specifies the regions of first junction portions 231 and second junctions 331 by image recognition and performs the welding.

Effects of First Exemplary Embodiment

The first exemplary embodiment described above achieves the following effects.

Film capacitor 1 includes: capacitor element 100 having first electrode 110 and second electrode 120; first bus bar 200 and second bus bar 300 connected to first electrode 110 and second electrode 120; and an exterior body (filler resin 30) made of a resin material and covering capacitor element 100, as well as parts of first bus bar 200 and second bus bar 300. First bus bar 200 and second bus bar 300 are exposed from the exterior body, and include first joint terminal 230 and second joint terminal 330 having a flat-plate shape that are joined to external terminals T1, T2. Partial regions on surfaces of first joint terminal 230 and second joint terminal 330 are set as first junction portion 231 and second junction portion 331 to be welded when external terminals T1, T2 are joined. The surfaces of first joint terminal 230 and second joint terminal 330 are provided with explicit portions (first groove 232 and second groove 332) that explicitly indicate regions of first junction portion 231 and second junction portion 331.

According to this configuration, when the inspection as to whether or not foreign matter that hinders welding adheres to first junction portion 231 and second junction portion 331 is performed, an inspector can easily grasp the regions of first junction portion 231 and second junction portion 331 on the surfaces of first joint terminal 230 and second joint terminal 330. Accordingly, the inspector can easily perform the inspection.

Further, one of the explicit portions is first groove 232 having an annular shape that is formed on the surface of first joint terminal 230 and explicitly indicates a boundary between the region of first junction portion 231 and another region, and the other one is second groove 332 having an annular shape that is formed on the surface of second joint terminal 330 and explicitly indicates a boundary between the region of second junction portion 331 and anther region. Thickness D1 of first joint terminal 230 at the portion of first groove 232 is thinner than thickness D2 of first joint terminal 230 at the portion of first junction portion 231. Thickness D3 of second joint terminal 330 at the portion of second groove 332 is thinner than thickness D4 of second joint terminal 330 at the portion of second junction portion 331.

According to this configuration, contact of a joining face of external terminal T1 with the surface of first joint terminal 230 is not hindered by first groove 232. In addition, heat generated at first junction portion 231 during the welding hardly escapes from first junction portion 231, and efficient welding can be possible. Similarly, contact of a joining face of external terminal T2 with the surface of second joint terminal 330 is not hindered by second groove 332. In addition, heat generated at second junction portion 331 during the welding hardly escapes from second junction portion 331, and the efficient welding can be possible.

Further, the exterior body (filler resin 30) includes casting face 31, and first joint terminal 230 and second joint terminal 330 are exposed from casting face 31.

When the exterior body is formed, the resin splashes near a liquid level face of filler resin 30 in a liquid phase state as casting face 31 may adhere to first junction portion 231 and second junction portion 331. According to this configuration, it is possible to easily find the adhesion of the resin to first junction portion 231 and second junction portion 331.

Second Exemplary Embodiment

Film capacitor 2 according to the second exemplary embodiment will be described. Film capacitor 2 is a so-called caseless capacitor.

Figure 12:
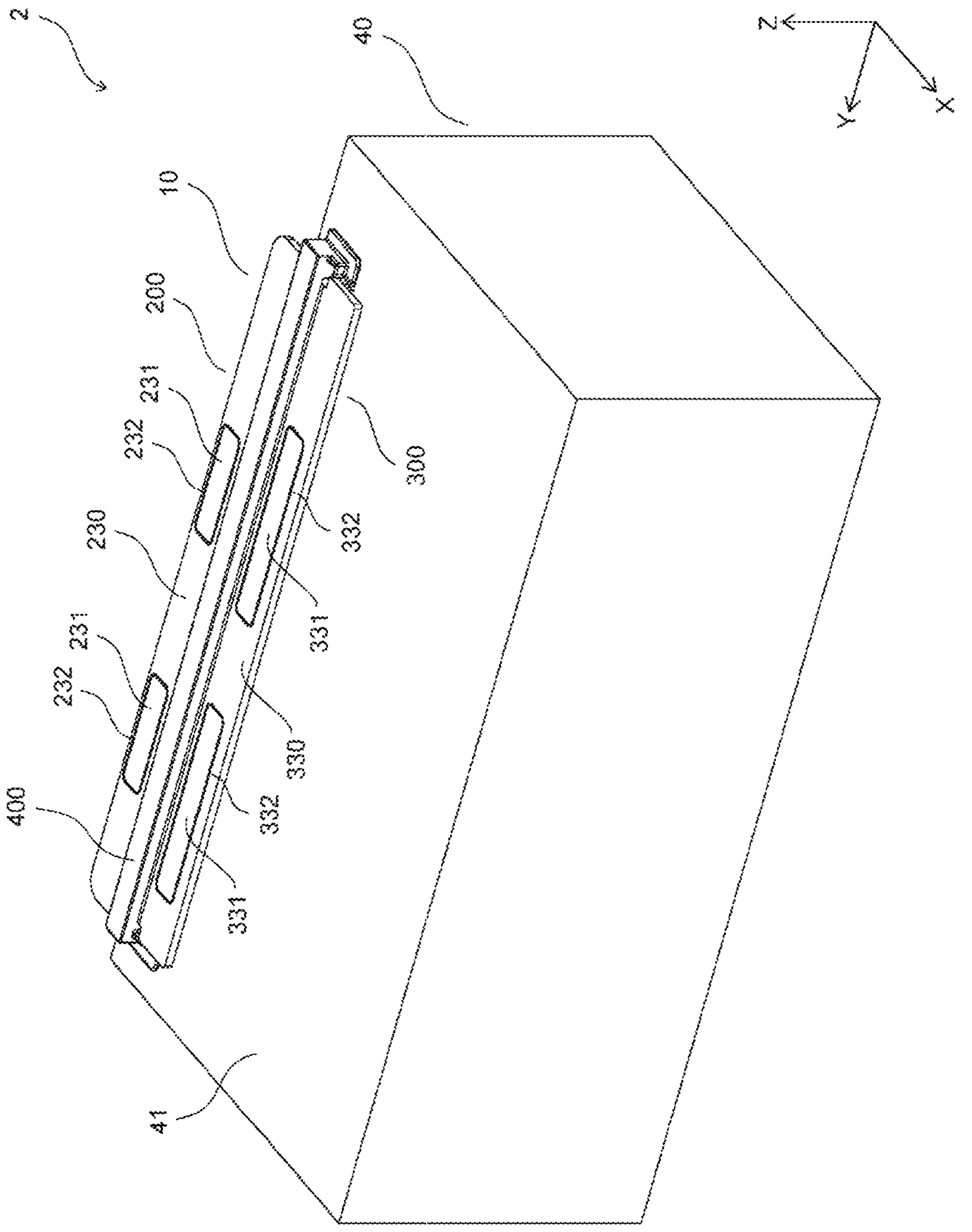
FIG. 12 is a perspective view illustrating a film capacitor according to a second exemplary embodiment.

FIG. 12 is a perspective view of film capacitor 2. In the present exemplary embodiment, the same components as the components in the first exemplary embodiment described above are denoted by the same reference numerals.

Unlike film capacitor 1 of the first exemplary embodiment described above, film capacitor 2 does not have a case, and capacitor element module 10 is covered only with exterior body 40.

Exterior body 40 is made of a thermosetting resin such as an epoxy resin and has a substantially rectangular parallelepiped shape. Exterior body 40 includes casting face 41, and first joint terminal 230 of first bus bar 200 and second joint terminal 330 of second bus bar 300 are exposed from casting face 41. At two positions of first joint terminal 230, there are first junction portions 231 explicitly indicated by first grooves 232 that are explicit portions, and at two positions of second joint terminal 330, there are second junction portions 331 explicitly indicated by second grooves 332 that are explicit portions.

In order to form exterior body 40, a casting mold in a rectangular box shape having an opening is used.

First, the housing step is performed, and capacitor element module 10 is housed in the casting mold through the opening. Capacitor element module 10 is positioned at a predetermined position in the casting mold with a positioning jig.

Next, the resin injection step is performed, and the liquid-phase resin is injected into the casting mold through the opening. First joint terminal 230 of first bus bar 200 and second joint terminal 330 of second bus bar 300 are exposed from the liquid level face of the liquid-phase resin as casting face 41 after curing.

Next, the resin curing step is performed, and heating is performed in the casting mold to heat the resin. In this way, the resin is cured in the casting mold, and exterior body 40 is formed. Thereafter, the casting mold is removed. Thus, as illustrated in FIG. 12, film capacitor 2 is completed.

Film capacitor 2 is installed in an external apparatus. As in the first exemplary embodiment described above, external terminal T1 is joined to first joint terminal 230 by welding at two first junction portions 231, and external terminal T2 is joined to second joint terminal 330 by welding at two second junction portions 331.

Effects of Second Exemplary Embodiment

According to the second exemplary embodiment, similar effects to the effects of the first exemplary embodiment described above can be achieved.

Third Exemplary Embodiment

Film capacitor 3 according to the third exemplary embodiment will be described. Film capacitor 3 is a so-called case-molded capacitor.

Figure 13:
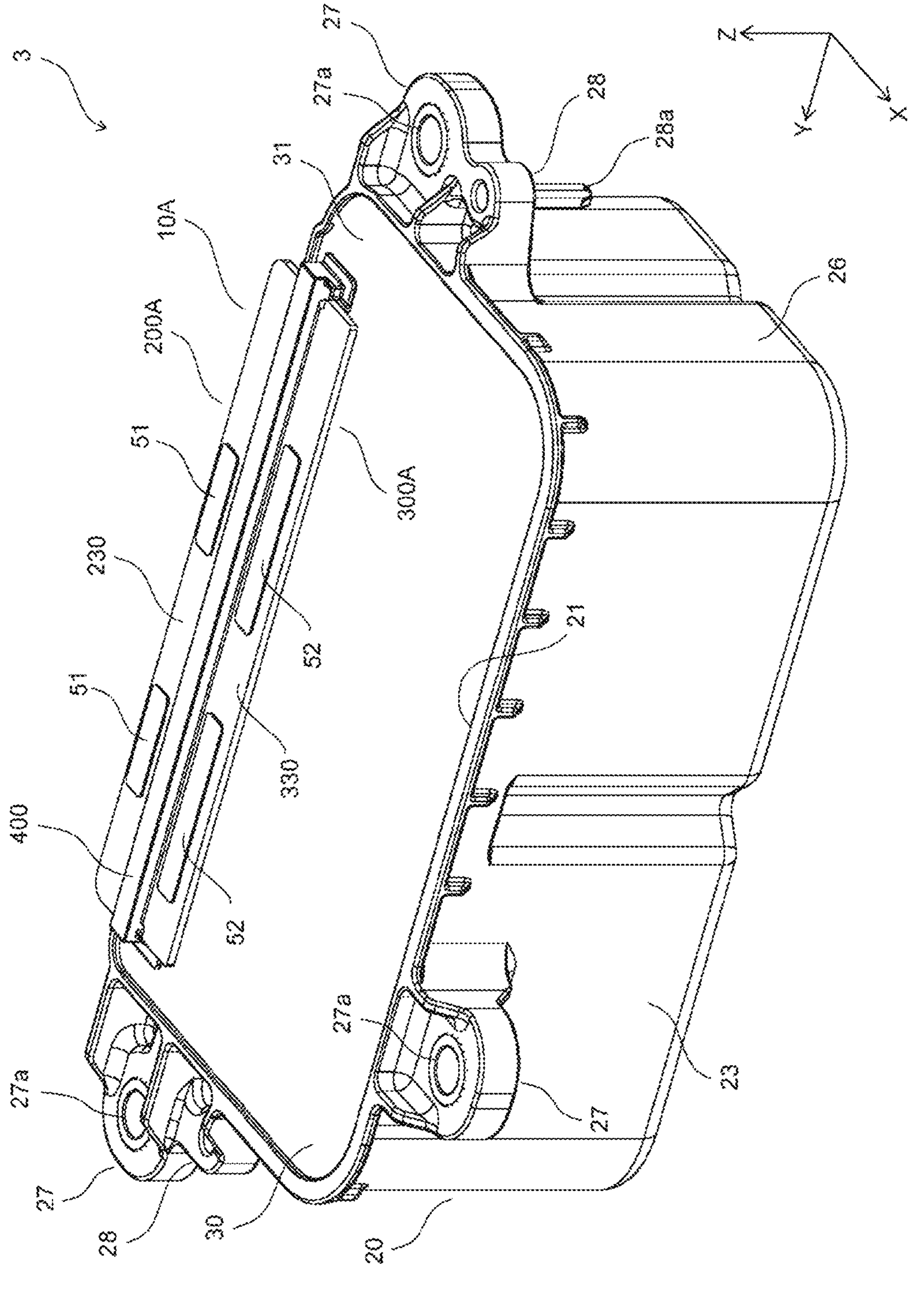
FIG. 13 is a perspective view illustrating a film capacitor according to a third exemplary embodiment.
Figure 14:
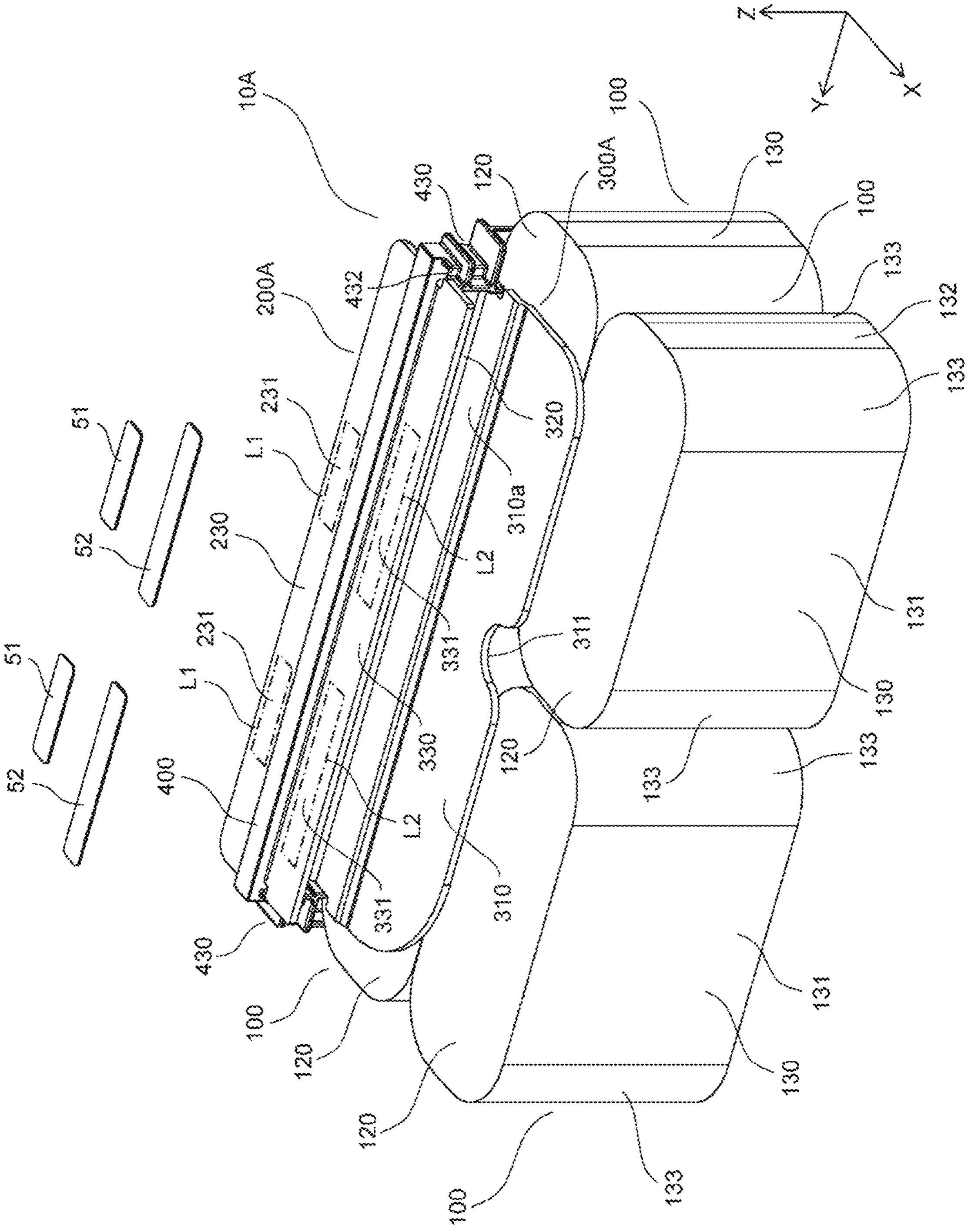
FIG. 14 is a perspective view illustrating a first protection member, a second protection member, and a capacitor element module according to the third exemplary embodiment.

FIG. 13 is a perspective view of film capacitor 3. FIG. 14 is a perspective view of first protection members 51, second protection members 52, and capacitor element module 10A. In the present exemplary embodiment, the same components as the components in the first exemplary embodiment described above are denoted by the same reference numerals.

Film capacitor 3 includes capacitor element module 10A, case 20, filler resin 30, two first protection members 51, and two second protection members 52. Capacitor element module 10A includes four capacitor elements 100, first bus bar 200A, second bus bar 300A, and insulating member 400.

Similarly to first bus bar 200 of the first exemplary embodiment described above, first bus bar 200A includes first electrode terminal 210, first relay 220, and first joint terminal 230. Then, on the surface of first joint terminal 230, as indicated by a virtual line L1 of a dashed line in FIG. 14, two first junction portions 231 having a substantially rectangular shape elongated in the Y-axis direction are set. However, unlike first bus bar 200 of the first exemplary embodiment described above, first bus bar 200A does not have an explicit portion that explicitly indicates a boundary between the region of each of the two first junction portions 231 and another region on the surface of first joint terminal 230.

Similarly to second bus bar 300 of the first exemplary embodiment described above, second bus bar 300A includes second electrode terminal 310, second relay 320, and second joint terminal 330. Then, on the surface of second joint terminal 330, as indicated by a virtual line L2 of a dashed line in FIG. 14, two second junction portions 331 having a substantially rectangular shape elongated in the Y-axis direction are set. However, unlike second bus bar 300 of the first exemplary embodiment described above, second bus bar 300A does not have an explicit portion that explicitly indicates a boundary between the region of each of the two second junction portions 331 and another region on the surface of second joint terminal 330.

Capacitor element module 10A is buried in filler resin 30 in case 20. First joint terminal 230 and second joint terminal 330 are exposed from casting face 31 of filler resin 30.

The two first protection members 51 are attached to the surface of first joint terminal 230 to cover all of the two first junction portions 231. Similarly, the two second protection members 52 are attached to the surface of second joint terminal 330 to cover all of the two second junction portions 331.

First protection members 51 and second protection members 52 are made of, for example, a resin such as polyethylene terephthalate (PET) into a film shape, have a substantially rectangular shape elongated in the Y-axis direction, and have substantially the same size as sizes of first junction portions 231 and second junction portions 331. First protection members 51 and second protection members 52 are respectively stuck to the surface of first joint terminal 230 and the surface of second joint terminal 330 by an adhesive applied to back faces thereof, and can be removed from these surfaces.

For example, after capacitor element module 10A is completed and before capacitor element module 10A is housed in case 20, first protection members 51 and second protection members 52 are attached to positions of regions set to first junction portions 231 in first joint terminal 230 and positions of regions set to second junction portions 331 in second joint terminal 330, respectively, using a dedicated sticking apparatus.

Figure 15A:
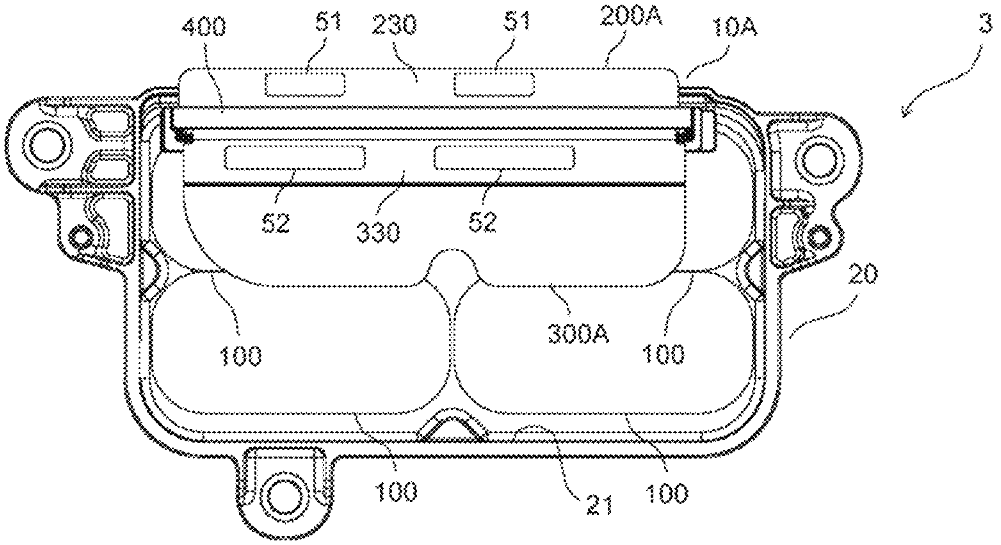
FIGS. 15A and 15B are views for illustrating a method for manufacturing the film capacitor according to the third exemplary embodiment.
Figure 15B:
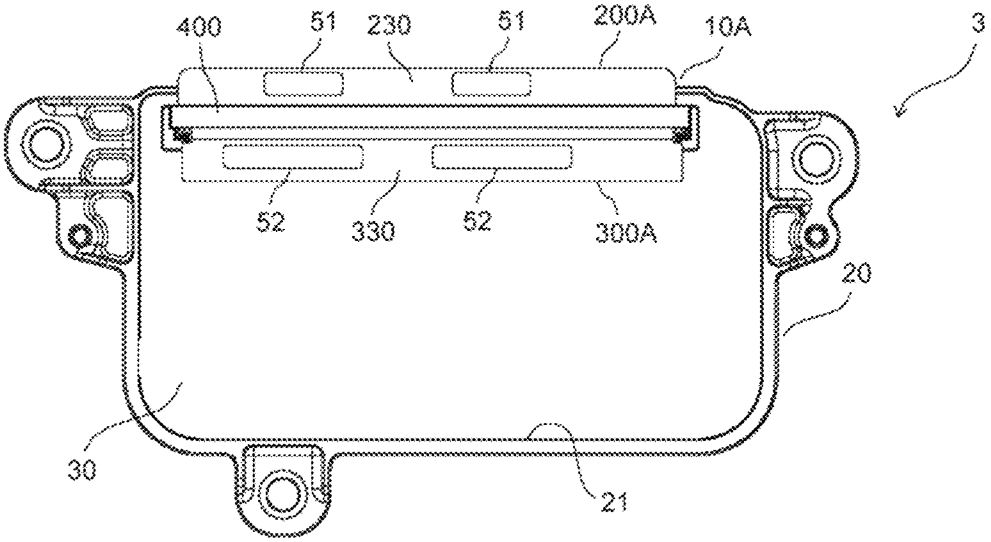

FIGS. 15A and 15B are views for illustrating a method for manufacturing film capacitor 3.

When film capacitor 3 is assembled, first, the housing step is performed. As illustrated in FIG. 15A, capacitor element module 10A is housed in case 20 through opening 21. At this time, the two first junction portions 231 of first joint terminal 230 are in a state of being covered with first protection members 51, and the two second junction portions 331 of second joint terminal 330 are in a state of being covered with second protection members 52. Capacitor element module 10A is positioned at a predetermined position in case 20 with a positioning jig.

Next, the resin injection step is performed. As illustrated in FIG. 15B, filler resin 30 in the liquid phase state is injected into case 20 through opening 21 to fill up to a position close to opening 21. First joint terminal 230 and second joint terminal 330 are exposed from the liquid level face of filler resin 30 in the liquid phase state as casting face 31 after the curing.

When case 20 is filled with filler resin 30, the resin curing step is performed, heating is performed in case 20 to heat filler resin 30. In this way, filler resin 30 is cured in case 20. Filler resin 30 serves as the exterior body covering capacitor element module 10A.

Thus, film capacitor 3 as illustrated in FIG. 13 is completed.

When filler resin 30 in the liquid phase state is injected into case 20 in the resin injection step, air is caught, so that a large number of bubbles can be generated in filler resin 30 in the liquid phase state in case 20. These bubbles may burst near the liquid level face, and the resin may splash from the liquid level face. The splashing resin may adhere to first joint terminal 230 and second joint terminal 330 present near the liquid level face. However, in the present exemplary embodiment, the two first junction portions 231 of first joint terminal 230 are covered with the two first protection members 51, and the two second junction portions 331 of second joint terminal 330 are covered with the two second protection members 52. Therefore, the resin adhering to first joint terminal 230 and second joint terminal 330 is prevented from adhering to each of first junction portions 231 and each of second junction portions 331. Further, even after the completion of film capacitor 3, the foreign matter such as dust is prevented from adhering to each of first junction portions 231 and each of second junction portions 331.

Film capacitor 3 is installed in an external apparatus. In film capacitor 3, after being installed in the external apparatus, the two first protection members 51 are removed from the surface of first joint terminal 230, and the two second protection members 52 are removed from the surface of second joint terminal 330. As in the first exemplary embodiment described above, external terminal T1 is joined to first joint terminal 230 by welding at the two first junction portions 231, and external terminal T2 is joined to second joint terminal 330 by welding at the two second junction portions 331. At this time, since substantially no foreign matter adheres to each of first junction portions 231 and each of second junction portions 331, the welding can be performed satisfactorily.

Note that, in film capacitor 3 of the present exemplary embodiment, it is not necessary to inspect whether or not the foreign matter adheres to first junction portions 231 and second junction portions 331 after the completion of film capacitor 3.

Effects of Third Exemplary Embodiment

The third exemplary embodiment described above achieves the following effects.

Film capacitor 3 includes: capacitor element 100 having first electrode 110 and second electrode 120; first bus bar 200A and second bus bar 300A connected to first electrode 110 and second electrode 120; and the exterior body (filler resin 30) made of the resin material and covering capacitor element 100, as well as parts of first bus bar 200A and second bus bar 300A. First bus bar 200A and second bus bar 300A are exposed from the exterior body, and include first joint terminal 230 and second joint terminal 330 having the flat-plate shape that are joined to external terminals T1, T2. Partial regions inside the surfaces of first joint terminal 230 and second joint terminal 330 are set as first junction portions 231 and second junction portions 331 to be welded when external terminals T1, T2 are joined. On the surfaces of first joint terminal 230 and second joint terminal 330, the regions of first junction portions 231 and second junction portions 331 are covered with detachable first protection members 51 and detachable second protection members 52.

According to this configuration, it is possible to prevent the foreign matter that hinders the welding from adhering to first junction portions 231 and second junction portions 331.

Further, the exterior body (filler resin 30) includes casting face 31, and first joint terminal 230 and second joint terminal 330 are exposed from casting face 31.

According to this configuration, when the exterior body is formed, it is possible to prevent the resin splashing near the liquid level face of filler resin 30 in the liquid phase state as casting face 31 from adhering to first junction portions 231 and second junction portions 331.

Further, a method for manufacturing film capacitor 3 includes: a housing step of housing, through opening 21, capacitor element module 10A in case 20 having opening 21, capacitor element module 10A including capacitor element 100 having first electrode 110 and second electrode 120, and first bus bar 200A and second bus bar 300A connected to first electrode 110 and second electrode 120; a resin injection step of injecting, through opening 21, a liquid-phase resin into case 20 housing capacitor element module 10A; and a resin curing step of curing the resin in the liquid phase state in case 20 to form an exterior body (filler resin 30) covering capacitor element module 10A. First bus bar 200A and second bus bar 300A include first joint terminal 230 and second joint terminal 330 having the flat-plate shape that are joined to external terminals T1, T2. Partial regions inside the surfaces of first joint terminal 230 and second joint terminal 330 are set as first junction portions 231 and second junction portions 331 to be welded when external terminals T1, T2 are joined. In the resin injection step, capacitor element 100, first bus bar 200A, and second bus bar 300A are buried in the liquid-phase resin such that first joint terminal 230 and second joint terminal 330 are exposed from the liquid level face of the liquid-phase resin as casting face 31 of the exterior body. The resin injection step and the resin curing step are performed in a state where the regions of first junction portions 231 and second junction portions 331 are covered with detachable first protection members 51 and detachable second protection members 52.

According to this method, when the exterior body is formed, it is possible to prevent the resin splashing near the liquid level face of filler resin 30 in the liquid phase state as casting face 31 from adhering to first junction portions 231 and second junction portions 331.

Fourth Exemplary Embodiment

Film capacitor 4 according to the fourth exemplary embodiment will be described. Film capacitor 4 is a so-called caseless capacitor.

Figure 16:
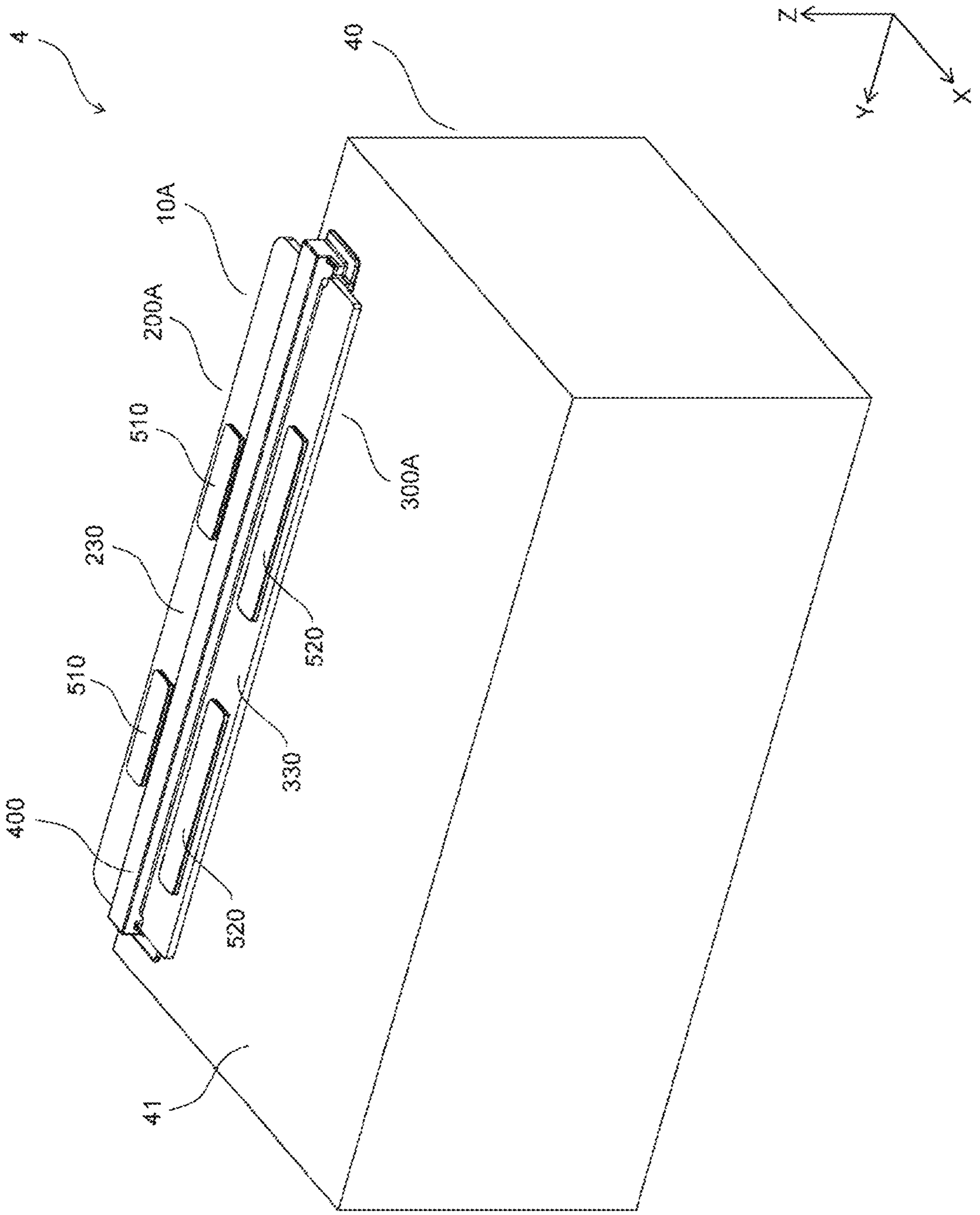
FIG. 16 is a perspective view illustrating a film capacitor according to a fourth exemplary embodiment.

FIG. 16 is a perspective view of film capacitor 4. In the present exemplary embodiment, the same components as the components in the third exemplary embodiment described above are denoted by the same reference numerals.

Unlike film capacitor 3 of the third exemplary embodiment described above, film capacitor 4 does not have a case, and capacitor element module 10A is covered only with exterior body 40.

Exterior body 40 is made of the thermosetting resin such as the epoxy resin and has the substantially rectangular parallelepiped shape. Exterior body 40 includes casting face 41, and first joint terminal 230 of first bus bar 200 and second joint terminal 330 of second bus bar 300 are exposed from casting face 41.

Figure 17A:
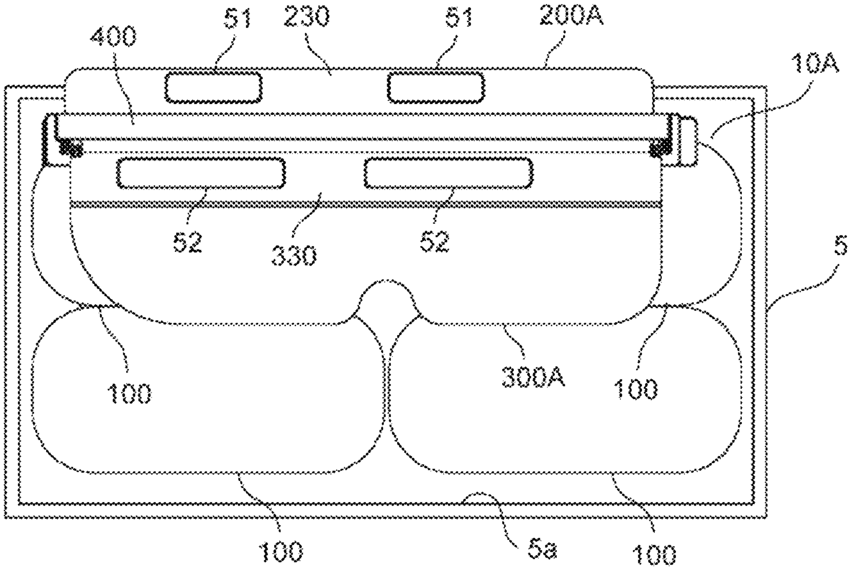
FIGS. 17A and 17B are views for illustrating a method for manufacturing the film capacitor according to the fourth exemplary embodiment.
Figure 17B:
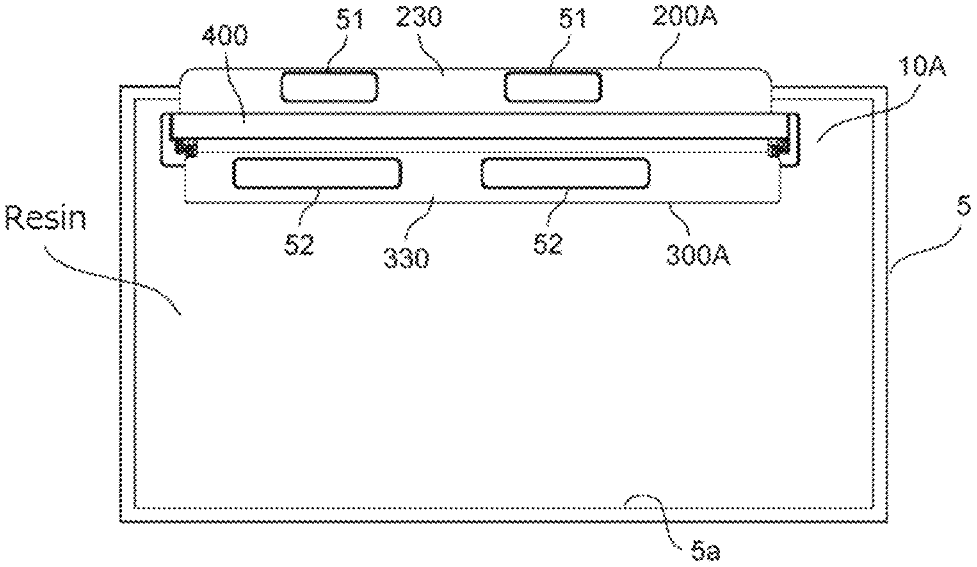

FIGS. 17A and 17B are views for illustrating a method for manufacturing film capacitor 4.

In order to form exterior body 40, casting mold 5 in a rectangular box shape having opening 5*a* is used.

First, a housing step is performed. As illustrated in FIG. 17A, capacitor element module 10A is housed in casting mold 5 through opening 5*a*. At this time, the two first junction portions 231 of first joint terminal 230 are in a state of being covered with first protection members 51, and the two second junction portions 331 of second joint terminal 330 are in a state of being covered with second protection members 52. Capacitor element module 10A is positioned at a predetermined position in casting mold 5 with a positioning jig.

Next, the resin injection step is performed. As illustrated in FIG. 17B, the liquid-phase resin is injected into casting mold 5 through opening 5*a*. First joint terminal 230 and second joint terminal 330 are exposed from the liquid level face of the liquid-phase resin as casting face 41 after the curing.

Next, the resin curing step is performed, and heating is performed in casting mold 5 to heat the resin. In this way, the resin is cured in casting mold 5, and exterior body 40 is formed. Thereafter, casting mold 5 is removed.

Thus, film capacitor 4 as illustrated in FIG. 16 is completed.

Film capacitor 4 is installed in an external apparatus. As in the third exemplary embodiment described above, in film capacitor 4, after being installed in the external apparatus, the two first protection members 51 are removed from the surface of first joint terminal 230, and the two second protection members 52 are removed from the surface of second joint terminal 330. Then, external terminal T1 is joined to first joint terminal 230 by the welding at the two first junction portions 231, and external terminal T2 is joined to second joint terminal 330 by the welding at the two second junction portions 331. At this time, since substantially no foreign matter adheres to each of first junction portions 231 and each of second junction portions 331, the welding can be performed satisfactorily.

Effects of Fourth Exemplary Embodiment

According to the fourth exemplary embodiment, similar effects to the effects of the third exemplary embodiment described above can be achieved.

MODIFICATION

Although the exemplary embodiments of the present disclosure have been described above, the present disclosure is not limited to the above exemplary embodiments, and application examples of the present disclosure can be variously modified in addition to the above exemplary embodiments.

For example, in the first exemplary embodiment to the fourth exemplary embodiment described above, first joint terminal 230 has two first junction portions 231 and second joint terminal 330 has two second junction portions 331. However, any number of first junction portions 231 and second junction portions 331 may be possible. Further, shapes of first junction portions 231 and second junction portions 331 may not be rectangular, but be any shape.

Further, in the first exemplary embodiment to the fourth exemplary embodiment described above, when external terminals T1, T2 are joined to first joint terminal 230 and second joint terminal 330, first junction portions 231 and second junction portions 331 are welded, but deposition such as ultrasonic welding or brazing such as soldering may be performed.

Further, in the first exemplary embodiment and the second exemplary embodiment described above, first joint terminal 230 is provided with first grooves 232 having the annular shape and second joint terminal 330 is provided with second grooves 332 having the annular shape, as the explicit portions, first grooves 232 indicating boundaries of first junction portions 231 and second grooves 332 indicating boundaries of second junction portions 331. However, as the explicit portions, annular lines indicating the boundaries may be printed with ink or the like. Also in this configuration, the explicit portions do not project from first joint terminal 230 and second joint terminal 330 to hinder the joining of external terminals T1, T2.

Further, in the third exemplary embodiment and the fourth exemplary embodiment described above, first protection members 51 have substantially the same sizes as the sizes of first junction portions 231 and second protection members 52 have substantially the same sizes as the sizes of second junction portions 331. However, first protection members 51 may have larger sizes than the sizes of first junction portions 231 and second protection members 52 may have larger sizes than the sizes of second junction portions 331. In this case, the adhesive may be applied to an outer region than first junction portions 231 and second junction portions 331 on back faces of first protection members 51 and second protection members 52. In this way, there is no need to worry about the adhesive remaining on first junction portions 231 and second junction portions 331 after first protection members 51 and second protection members 52 are removed.

Further, in the third exemplary embodiment and the fourth exemplary embodiment described above, the surface of first joint terminal 230 is not provided with the explicit portion that explicitly indicates the boundary between the region of each of first junction portions 231 and the other region, and the surface of second joint terminal 330 is not provided with the explicit portion that explicitly indicates the boundary between the region of each of second junction portions 331 and the other region. However, as the explicit portions, the surfaces of first joint terminal 230 may be provided with first grooves 232 and second joint terminal 330 may be provided with second grooves 332 as in the first exemplary embodiment and the second exemplary embodiment described above. This makes it possible to visually confirm whether or not first protection members 51 and second protection members 52 are attached in a state of being shifted from first junction portions 231 and second junction portions 331.

Further, configurations of first bus bars 200, 200A and second bus bars 300, 300A are not limited to the configurations illustrated in the first exemplary embodiment to the fourth exemplary embodiment described above, and may be any configuration.

Further, in the first exemplary embodiment to the fourth exemplary embodiment described above, film capacitors 1 to 4 each include four capacitor elements 100. However, the number of capacitor elements 100 can be appropriately changed, such as only one.

Further, in the first exemplary embodiment to the fourth exemplary embodiment described above, each of capacitor elements 100 is formed by stacking two metallized films each made by having aluminum vapor-deposited on a dielectric film, and winding or laminating the metallized films stacked. Alternatively, each of capacitor elements 100 may be formed by stacking an insulating film and the metallized film made by having the aluminum vapor-deposited on both sides of the dielectric film, and winding and laminating the metallized film and the insulating film.

Further, in the first exemplary embodiment to the fourth exemplary embodiment described above, film capacitors 1 to 4 are cited as examples of the capacitor of the present disclosure. However, the present disclosure can also be applied to capacitors other than film capacitors 1 to 4.

In addition, the exemplary embodiments of the present disclosure can be modified in various ways as appropriate within the scope of the technical idea disclosed in the appended claims.

The present disclosure is useful for capacitors used in various electronic devices, electric devices, industrial devices, electric components of vehicles, and the like.

What is claimed is:

1. A capacitor comprising:

a capacitor element including an electrode;

a bus bar connected to the electrode; and an exterior body that includes a resin material and covers the capacitor element and a part of the bus bar, wherein:

the bus bar includes a joint terminal having a flat-plate shape, the joint terminal being exposed from the exterior body and being to be joined with an external terminal, the joint terminal includes a surface with a partial region served as a junction portion where welding, deposition, or brazing is performed when the external terminal is joined, and the surface of the joint terminal includes an explicit portion that explicitly indicates a region of the junction portion.

2. The capacitor according to claim 1, wherein:

the explicit portion is a groove having an annular shape that explicitly indicates a boundary between the region of the junction portion and another region, the explicit portion being disposed on the surface of the joint terminal, and a thickness of the joint terminal at the groove is smaller than a thickness of the joint terminal at the junction portion.

3. A capacitor comprising:

a capacitor element including an electrode;

a bus bar connected to the electrode; and an exterior body that includes a resin material and covers the capacitor element and a part of the bus bar, wherein:

the bus bar includes a joint terminal having a flat-plate shape, the joint terminal being exposed from the exterior body and being to be joined with an external terminal, the joint terminal includes a surface with a partial region served as a junction portion where welding, deposition, or brazing is performed when the external terminal is joined, and the surface of the joint terminal includes a region of the junction portion that is covered with a detachable protection member.

4. The capacitor according to claim 1, wherein:

the exterior body includes a casting face, and the joint terminal is exposed from the casting face.

5. The capacitor according to claim 3, wherein:

the exterior body includes a casting face, and the joint terminal is exposed from the casting face.

6. A method for manufacturing a capacitor, the method comprising:

a housing step of housing a capacitor element module into a case having an opening through the opening, the capacitor element module including a capacitor element having an electrode and a bus bar connected to the electrode;

a resin injection step of injecting a liquid-phase resin into the case where the capacitor element module is housed through the opening; and a resin curing step of curing the liquid-phase resin in the case to form an exterior body covering the capacitor element module, wherein:

the bus bar includes a joint terminal having a flat-plate shape, the joint terminal being to be joined with an external terminal, the joint terminal includes a surface with a partial region served as a junction portion where welding, deposition, or brazing is performed when the external terminal is joined, in the resin injection step, the capacitor element and the bus bar are buried in the liquid-phase resin so that the joint terminal is exposed from a liquid level face of the liquid-phase resin that is to be a casting face of the exterior body, and the resin injection step and the resin curing step are performed in a state where a region of the junction portion is covered with a detachable protection member.

7. A method for manufacturing a capacitor, the method comprising:

a housing step of housing a capacitor element module into a casting mold having an opening through the opening, the capacitor element module including a capacitor element having an electrode and a bus bar connected to the electrode;

a resin injection step of injecting a liquid-phase resin into the casting mold where the capacitor element module is housed through the opening; and a resin curing step of curing the liquid-phase resin in the casting mold to form an exterior body covering the capacitor element module, wherein:

the bus bar includes a joint terminal having a flat-plate shape, the joint terminal being to be joined with an external terminal, the joint terminal includes a surface with a partial region served as a junction portion where welding, deposition, or brazing is performed when the external terminal is joined, in the resin injection step, the capacitor element and the bus bar are buried in the liquid-phase resin so that the joint terminal is exposed from a liquid level face of the liquid-phase resin that is to be a casting face of the exterior body, and the resin injection step and the resin curing step are performed in a state where a region of the junction portion is covered with a detachable protection member.

* * * * *